United States Patent
Kawai et al.

(10) Patent No.: US 6,577,623 B1
(45) Date of Patent: *Jun. 10, 2003

(54) FIXED-LENGTH CELL DATA AND TIME-DIVISION DATA HYBRID MULTIPLEXING APPARATUS

(75) Inventors: Yoshio Kawai, Kanagawa (JP); Kazuhiro Shibuya, Kanagawa (JP); Yasuyuki Mitsumori, Kanagawa (JP); Shigeharu Murakami, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,082

(22) Filed: Oct. 26, 1998

(30) Foreign Application Priority Data

Oct. 28, 1997 (JP) .............................................. 9-296020

(51) Int. Cl.[7] .............................................. H04L 12/66
(52) U.S. Cl. ..................... 370/354; 370/442; 370/395.1
(58) Field of Search .......................... 370/231, 352–356, 370/401, 257, 398, 363, 376, 412, 395.61, 395.6, 535, 395.65, 395.1, 467, 489

(56) References Cited

U.S. PATENT DOCUMENTS

| | | | | |
|---|---|---|---|---|
| 5,933,607 A | * | 8/1999 | Tate et al. | 370/395.61 |
| 5,999,529 A | * | 12/1999 | Bernstein et al. | 370/376 |
| 6,151,325 A | * | 11/2000 | Hluchyj | 370/398 |
| 6,205,134 B1 | * | 3/2001 | Jordan et al. | 370/352 |

FOREIGN PATENT DOCUMENTS

| | | |
|---|---|---|
| JP | 3-46638 | 10/1991 |
| JP | 06-006386 | 1/1994 |
| JP | 6-97956 | 4/1994 |

* cited by examiner

Primary Examiner—Hassan Kizou
Assistant Examiner—John Pezzlo
(74) Attorney, Agent, or Firm—Katten Muchin Zavis Rosenman

(57) ABSTRACT

Terminal ports, line ports, and various process boards can be freely connected to a TDM bus and an ATM bus through a TDM bus slot and an ATM bus slot. Therefore, a terminal port for terminating a time-division multiplexing, a terminal port for terminating an asynchronous transfer mode, a terminal port for terminating both, etc. can be freely combined in the same unit. Additionally, the communications system can be easily modified using the same unit by changing a package device of the line port. Furthermore, the functions realized by the unit can be flexibly extended by changing the package device of various process board.

14 Claims, 16 Drawing Sheets

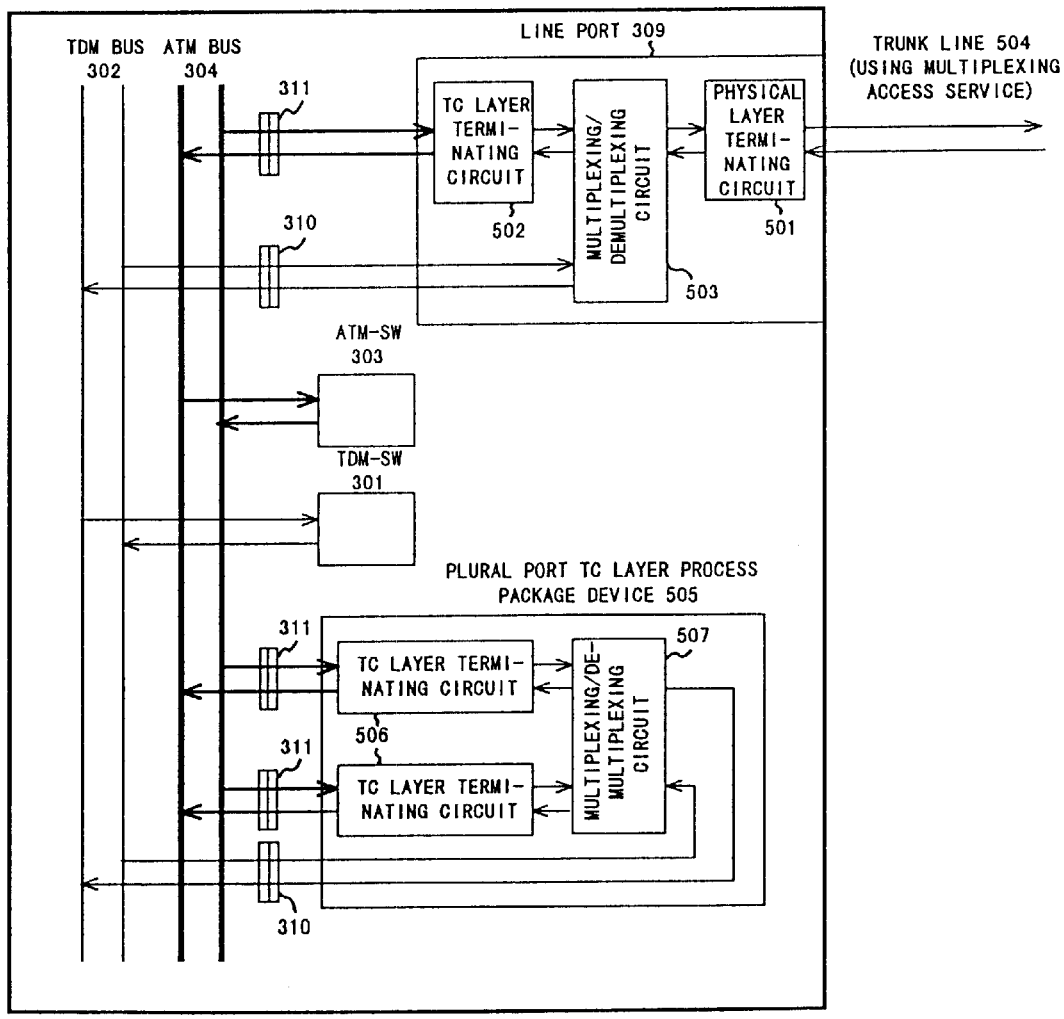
F I G. 5

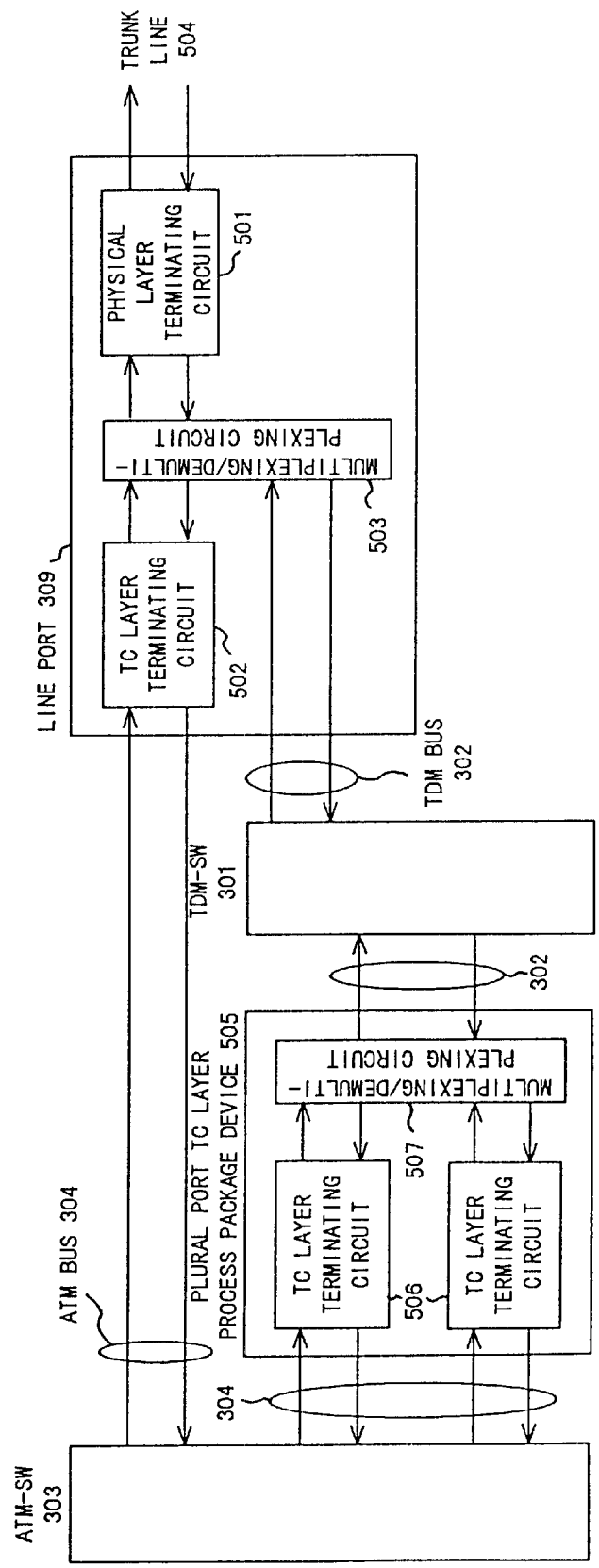
F I G. 6

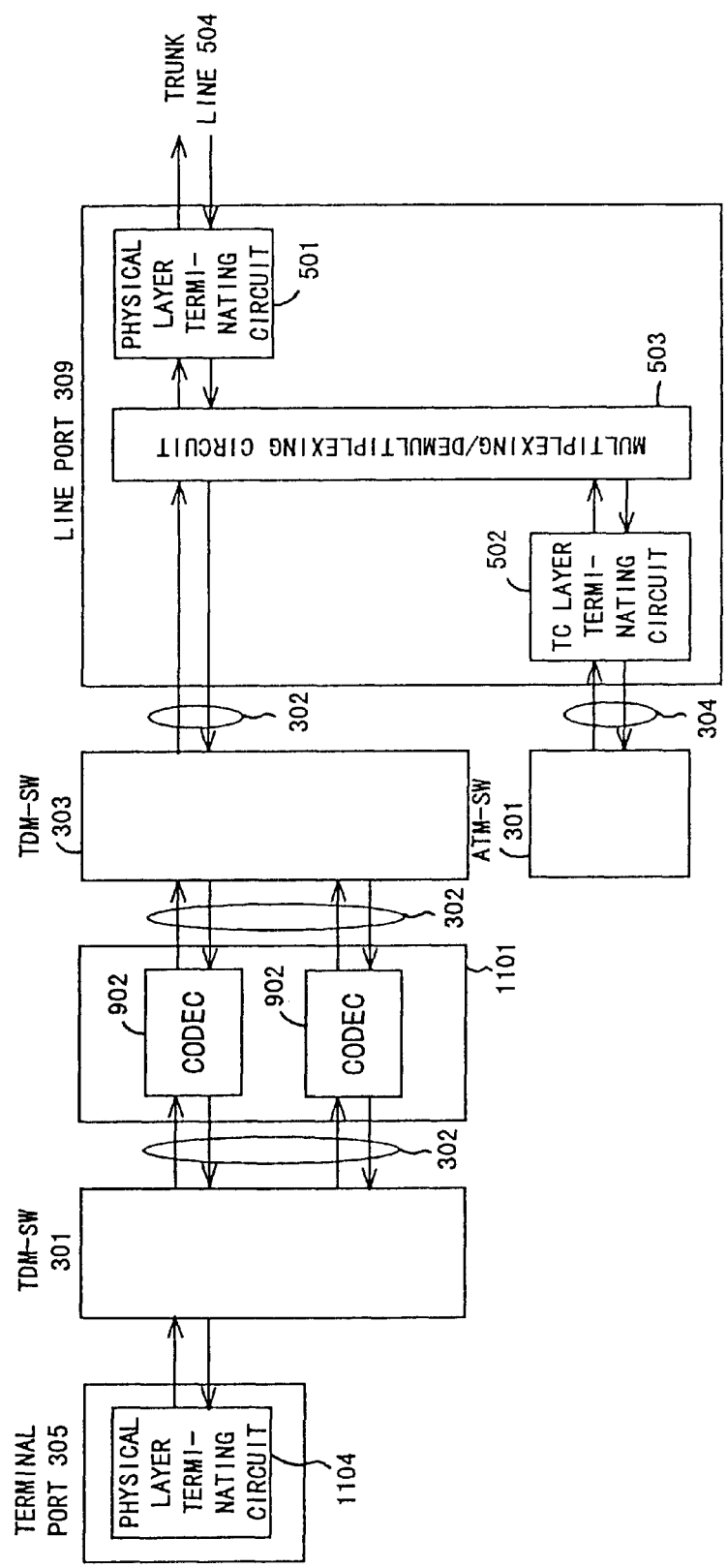
F I G. 14

FIXED-LENGTH CELL DATA AND TIME-DIVISION DATA HYBRID MULTIPLEXING APPARATUS

BACKGROUND OF THE INVENTION

1. Field of the Invention

The present invention relates to a multiplexing technology for processing fixed-length cell data such as an ATM cell, etc. and time-division data in time-division multiplexing communications when these data coexist.

2. Description of the Related Art

Recently, as a private branch LAN, etc. becomes more and more popular with Internet access, intra-net, and groupware, etc. implemented, a WAN communications device is required to integrate and accommodate a conventional voice trunk line and a low-speed data transmission line with a LAN traffic, and to dynamically secure a relay bandwidth of a LAN traffic having a high burst function.

An ATM multiplexing technology for transmitting each piece of data by logically multiplexing fixed-length cell data has been studied as a technology of dynamically using a relay bandwidth mainly for use in a broadband field. Recently, this ATM multiplexing technology has been applied to a narrowband field.

In this case, an existing STM (synchronous transfer mode) exclusive line capable of mainly using a multiplexing access service, etc. is used as a trunk line. In transmitting existing low-rate media information, a delay occurring when data is put in a cell has a large influence on the communications quality. Consequently, there is a need for a multiplexing device capable of integrating an ATM multiplexing technology for efficient transmission and flexible operation under traffic fluctuations into a TDM (time-division multiplexing) technology for exactly guaranteeing the quality of a circuit.

FIG. 1 shows the configuration of the first conventional technology of a multiplexing device. With this multiplexing device, the data communications between terminal ports 103, between a terminal port 103 and the line port 104, or between line ports 104 (one of the ports is not shown in the figure) are made through an ATM switch (ATM-SW) 101 and an ATM bus 102 using multiplexed ATM cells.

Therefore, to support the function of utilizing the TDM multiplexing technology, a package for realizing the TDM function is independently developed and implemented such that a realized TDM process can be performed within the package.

FIG. 2 shows the configuration of the second conventional technology of a multiplexing device. With this multiplexing device, a TDM multiplexing unit 201 is completely separate in function from an ATM multiplexing unit 202, and the data communications between these units are established through a cell assembling/disassembling unit (CLAD) 211 in the ATM multiplexing unit 202 and a CLAD interface unit (CLAD IF) 207 in the TDM multiplexing unit 201.

A terminal port 205 in the TDM multiplexing unit 201 accommodates a TDM terminal for TDM communications. The TDM multiplexing unit 201 terminates the STM exclusive line for TDM transmission. The data communications between these ports are established through a TDM switch (TDM-SW) 203 and a TDM bus 204 using multiplexed time-division data.

On the other hand, a line port 210 in the ATM multiplexing unit 202 terminates an ATM exclusive line. A terminal port not shown in FIG. 2 accommodates an ATM terminal which establishes ATM communications. The data communications between these ports are established through an ATM-SW 208 and an ATM bus 209 using a multiplexed ATM cell.

The CLAD IF 207 in the TDM multiplexing unit 201 has the function of multiplexing/demultiplexing time-division data to be put in a cell, and the function of processing the multiplexed time-division data as a frame or multi-frames. The CLAD IF 207 in the TDM multiplexing unit 201 and the CLAD 211 in the ATM multiplexing unit 202 are connected by a TDM multiplexing line 212 in which a frame or multi-frames are put. Then, the CLAD 211 in the ATM multiplexing unit 202 puts in a cell the time-division data which has been multiplexed and put in a frame or multi-frames. It also has the function of converting an ATM cell into time-division data.

Described below is the first case of conventional ways for effective use of resources, in which an ATM cell i's transmitted using an arbitrary time slot of an STM exclusive line through an existing STM exclusive line available mainly for multiplexed access services, etc., not through a large transmission-capacity ATM exclusive line as a trunk line of the ATM cell.

To realize the first case with the configuration according to the first conventional technology shown in FIG. 1, it is necessary to realize within the line port 104 the function of terminating the time-division multiplexed data transmitted through the STM exclusive line, and the function of mapping an ATM cell input through. the ATM bus 102 to an arbitrary time slot in the STM exclusive line, and conversely retrieving and outputting to the ATM bus 102 the ATM cell mapped to the optional time slot.

Therefore, if the number of groups of the time slots to which the ATM cells are mapped becomes large, then it is necessary to correspondingly extend the above described conversion function in the line port 104. Therefore, it is hard to realize a flexible line port 104, and the number of extended ports is limited.

On the other hand, the first case with the configuration according to the second conventional technology shown in FIG. 2 can be realized as follows. That is, the line port 210 for terminating time-division data is extended in the ATM multiplexing unit 202 corresponding to each time slot to which ATM cells are mapped. The line port 210 is connected to the terminal port 205 provided in the TDM multiplexing unit 201. The ATM cell transmitted to and from the line port 210 in the ATM multiplexing unit 202 through the terminal port 205 is mapped to predetermined one or more time slots in the STM exclusive line terminated by a line port 206.

In this case, when the number of time slots to which the ATM cell is to be mapped increases in the STM exclusive line which terminates the line port 206, only the line port 210 in the ATM multiplexing unit 202 and the terminal port 205 in the TDM multiplexing unit 201 have to be correspondingly extended. Therefore, with the configuration according to the A second conventional technology, a flexible operation can be realized to some extent when the number of time slots to which an ATM is to be mapped increases.

However, with the configuration according to the second conventional technology, it is necessary to simultaneously extend the line port 210 in the ATM multiplexing unit 202 and the terminal port 205 in the TDM multiplexing unit 201, thereby causing the problem that the number of packages increases.

Described below is the second case in which an ATM cell contains existing low-rate media data such as modem data, FAX data, etc.

To include low-rate media data in an ATM cell, a CLAD is required to assemble and disassemble the ATM cell. In this case, the low-rate media data has to be mapped to an ATM cell without padding dummy data after the low-rate media data is time-division multiplexed, in order to suppress the delay in putting data in a cell and prevent the reduction in multiplexing efficiency. Furthermore, the function of arbitrarily relay the multiplexed low-rate media data in units of that media data is also required.

To realize the second case with the configuration according to the first conventional technology shown in FIG. 1, the terminal port 103 is designed to contain a plurality of terminals which communicate low-rate media data. In the terminal port 103, the low-rate media data is time-division multiplexed/demultiplexed in units of plural terminals. The corresponding time-division multiplexed data should be mapped to an ATM cell.

As a result, according to the first conventional technology, the low-rate media data which can be time-division multiplexed is limited to the data which can be communicated by a terminal accommodated by the terminal port 103. Accordingly, there is the problem that it is difficult to realize a flexible terminal port 103, and the time of time-division-multiplexing of low-rate media data is limited.

Furthermore, according to the first conventional technology, it is not possible to realize the function of arbitrarily relay the low-rate media data in units of that media data.

On the other hand, the second case can be realized with the configuration according to the second conventional technology shown in FIG. 2 in the following steps. For example, low-rate media data for each terminal port 103 is time-division multiplexed/demultiplexed in the CLAD IF 207 in the TDM multiplexing unit 201. Then, the corresponding time-division multiplexed data is mapped to the ATM cell in the CLAD 211 in the ATM multiplexing unit 202.

However, with the configuration according to the second conventional technology, the TDM multiplexing unit 201 is completely separate in function from the ATM multiplexing unit 202, and it is difficult to collectively control the CLAD IF 207 and the CLAD 211. Therefore, it is necessary to communicate the control information for mapping time-division multiplexed data to an ATM cell between the CLAD IF 207 and the CLAD 211. Accordingly, firmware, etc. is required to assign the control information to the TDM multiplexing line 212 and communicate the control information in each of the TDM multiplexing unit 201 and the ATM multiplexing unit 202, thereby causing the problem that the entire system is costly, the control process to be realized is complicated, and the system performance becomes deteriorated. With the configuration according to the second conventional technology, the following control sequence is required to realize the function of arbitrarily relaying multiplexed low-rate media data in units of that media data. That is, an ATM cell to be relayed is converted into time-division multiplexed data by the CLAD 211 in the ATM multiplexing unit 202 and transmitted to the CLAD IF 207 in the TDM multiplexing unit 201, and the time-division data is reassigned. Then, the resultant new time-division multiplexed data is transmitted again to the CLAD 211 in the ATM multiplexing unit 202 and converted into an ATM cell. In this case, since further complicated control information should be communicated between the CLAD IF 207 and the CLAD 211, the necessary function becomes too complicated.

Described below is the third case in which the voice data communicated through a terminal port (digital trunk) with a private branch exchange (PBX) is stored in an ATM cell.

In this third case, original voice data is compressed and encoded for each voice channel, and then the compressed and encoded voice data is put in a cell. Conversely, the function of retrieving the compressed and encoded voice data from an ATM cell, and then decoding the original voice data is required.

To realize the third case with the configuration according to the first conventional technology shown in FIG. 1, it is necessary to provide the terminal port 103 with a CODEC circuit for compressing, encoding and decoding voice data. The scale of the provided CODEC circuit depends on the number of the voice channels to be processed by the terminal port 103. Accordingly, there is the problem that it is difficult with this configuration to realize a flexible terminal port 103.

On the other hand, the third case is realized with the configuration according to the second conventional technology shown in FIG. 2 by implementing a CODEC circuit in the TDM multiplexing unit 201, and putting the compressed and encoded voice data in a cell with the CLAD 211 in the ATM multiplexing unit 202.

However, with the configuration according to the second; conventional technology, as in the above described second case, control information for mapping the compressed and encoded time-division multiplexed voice data to an ATM cell should be communicated between the CODEC circuit in the TDM multiplexing unit 201 and the CLAD 211 in the ATM multiplexing unit 202. Accordingly, firmware, etc. is required to assign the control information to the TDM multiplexing line 212 and communicate the control information to each of the TDM multiplexing unit 201 and the ATM multiplexing unit 202, thereby causing the problem that the entire system is costly, the control process to be realized is complicated, and the system performance becomes deteriorated.

In compressing and encoding voice data, a no-voice period is detected to stop transmitting voice data in that period. However, it is also necessary to notify the CLAD 211 from the CODEC circuit in the TDM multiplexing unit 201 of the no-voice detection information for stopping putting data in a cell in the no-voice period detected in the CODEC circuit. This also implies complicated control.

Finally described is the fourth case in which, if it is requested to prevent media data from being deteriorated in communications quality due to the delay in putting data in a cell, due to the discard of cells, etc., then the media data is time-division multiplexed (TDM multiplexed), the high-burst LAN data, etc. is time-division-multiplexed into predetermined one or more time slots after being ATM-multiplexed, and the data is transmitted in a mixed manner through one STM exclusive line.

When the fourth case is realized with the configuration according to the first conventional technology shown in FIG. 1, the communications data of the terminal port 103 and the line port 104 are necessarily put in cells. Therefore, it is not possible to realize the fourth case with the configuration according to the first conventional technology.

On the other hand, with the configuration according to the second conventional technology, the fourth case can be realized as in the first case, but has the same problem as the first case.

There also is the problem that, in assigning each time slot in the STM exclusive line, management is required in both the TDM multiplexing unit 201 and ATM multiplexing unit 202, thereby requiring complicated control.

As described above, with the configuration according to the first conventional technology shown in FIG. 1, there is the problem that it is hard, or it is possible but with limitations in specification to realize the functions of the first through fourth cases. Furthermore, there also is the problem that it is possible to realize the functions but an exclusive package has to be developed for each function, thereby enlarging the development scale and cost.

On the other hand, with the configuration according to the second conventional technology shown in FIG. 2, it is possible to realize the functions of the above described first through fourth cases, but it is necessary to develop a terminal port, a line port, a CLAD IF, a CLAD, etc. independently for the TDM multiplexing unit 201 and the ATM multiplexing unit 202. As a result, the development scale and cost are enlarged. There also is the problem that the control process for collectively managing the TDM multiplexing unit 201 and the ATM multiplexing unit 202 has become too complicated to be successfully performed.

SUMMARY OF THE INVENTION

The present invention has been developed based on the above described background, and aims at easily and collectively managing the TDM-multiplexed portion and the ATM-multiplexed portion by allowing the TDM system and the ATM system to efficiently coexist in a small scale and at a low cost.

The present invention is based on the fixed-length cell data/time-division data hybrid multiplexing device capable of processing fixed-length cell data such as an ATM cell, etc. and time-division data stored in a mixed manner.

First, an asynchronous transfer mode bus (ATM bus 304) asynchronously transfers fixed length cell data (ATM cells).

The time-division multiplexing bus (TDM bus 302) transfers multiplexed time-division data.

A control bus (control bus 402) transfers control data.

A time division multiplexing switch (TDM-SW 301) is connected to a time-division multiplexing bus, and switches the time-division data multiplexed in the time-division multiplexing bus.

An asynchronous transfer mode switch (ATM-SW 303) is connected to an asynchronous transfer mode bus and switches fixed-length cell data in the asynchronous transfer mode bus.

One or more time-division multiplexing bus slots (TDM bus slot 310) can implement one of the various process package devices (various process boards 308) for processing time-division data or fixed-length cell data, and are connected to a time-division multiplexing bus.

One or more asynchronous transfer mode bus slot (ATM bus slot 311) can implement one of the above described various process package devices, and are connected to an asynchronous transfer mode bus.

One or more control bus slots (control bus slot 403) can implement one of the above described various process package devices and are connected to a control bus.

With the configuration according to the above described invention, the time-division multiplexing bus slot can be provided with any of a hybrid line port package device (line port 309) containing the functions for terminating a time-division multiplexing line for transmitting a multiplexed time slot and mapping the fixed length cell data to the time slot; the hybrid process package device (various process boards 308), simultaneously connected to an asynchronous transfer mode bus slot, for mapping the time slot in the time-division multiplexing bus to the fixed-length cell data in the asynchronous transfer mode bus; a first terminal port package device (terminal port 305 or 307) for accommodating various terminals; a time-division multiplexing line port package device (line port 309) for terminating a time-division multiplexing line for transmitting multiplexed time division data; and a time-division multiplexing data processing package device (various process boards 308) for processing time-division data input through a time-division multiplexing bus and outputting it through the time-division multiplexing bus.

The asynchronous transfer mode bus slot can be provided with any of a hybrid line port package device (line port 309); a hybrid process package device (various process boards 308) simultaneously connected to the time-division multiplexing bus slot; a second terminal port package device (terminal port 306 or 307) for accommodating various terminals; an asynchronous transfer mode line port package device (line port 309) for terminating the asynchronous transfer mode line for transmitting fixed-length cell data (line port 309); and a fixed-length cell process package device (various process boards 308) for processing fixed-length cell data input through an asynchronous transfer mode bus, and outputting the processed data through the asynchronous transfer mode bus.

With the above described configuration according to the present invention, a terminal port for terminating a time-division multiplexing, a terminal port for terminating an asynchronous transfer mode, a terminal port for terminating both time-division multiplexing and asynchronous transfer mode, etc. can be implemented as an optional combination among them in the same unit by including a time-division multiplexing bus slot, an asynchronous transfer mode bus slot, and a control bus slot.

Furthermore, with the configuration according to the present invention, the same unit can be used when the communications type realized by the unit is changed by connecting a line port package device to the purpose to one or both of the time-division multiplexing bus slot and the asynchronous transfer mode bus slot.

With the configuration according to the present invention, the function realized by the hybrid multiplexing device according to the present invention can be flexibly extended by only connecting one of various process packages suited to the purpose to one or both of the time-division multiplexing bus slot and the asynchronous transfer mode bus slot.

Furthermore, with the configuration according to the present invention, collective control can be realized on all of various process package devices through a control bus slot, thereby solving the problem of the conventional technology that the control process is necessarily complicated.

With the above described configuration, the hybrid line port package device (309) for realizing various process package devices can be designed as a combination of a physical layer termination circuit, a transmission conversions layer termination circuit, and a multiplexing/demultiplexing circuit.

First, a physical layer terminating circuit (501) terminates the physical layer of a time-division multiplexing line (STM exclusive line).

Next, a transmission convergence layer terminating circuit (TC layer terminating circuit 502) can be connected to an asynchronous transfer mode bus slot, and the fixed-length cell data input through the asynchronous transfer mode bus is mapped to predetermined one or more time slots in a time-division multiplexing line. Conversely, the TC layer terminating circuit 502 retrieves the fixed-length cell data mapped to the time slots, and outputs the data to an asynchronous transfer mode bus.

Then, a multiplexing/demultiplexing circuit (503) can be connected to the transmission convergence layer terminating circuit, and also to the time-division multiplexing bus slot. Then, it multiplexes the time slot input from the transmission convergence layer terminating circuit and the time slot input from the time-division multiplexing bus, and outputs the result to the time-division multiplexing line through the physical layer terminating circuit. Conversely, the multiplexing/demultiplexing circuit 503 demultiplexes the time-division data output to the transmission convergence layer terminating circuit and the time-division data output to the time-division multiplexing bus from the time-division multiplexed data input from the time-division multiplexing line through the physical layer terminating circuit. A fixed-length cell corresponding to a transmission path can be mapped to a time-division multiplexing line only by connecting the hybrid line port package device having the above described configuration to the asynchronous transfer mode bus slot and the time-division multiplexing bus slot (and control bus slot). In the time-division multiplexing line, a time slot for transmitting a fixed-length cell and a time slot for transmitting time-division data can be kept in a mixed manner.

The above described configuration according to the present invention can be designed as a plural port TC layer process package device (505) which realizes one of various process package devices, and can comprise the following transmission convergence layer terminating circuit and multiplexing/demultiplexing circuit.

First, one or more transmission convergence layer terminating circuits (TC layer terminating circuit 506) can be connected to an asynchronous transfer mode bus slot. It maps the fixed-length cell data input from the asynchronous transfer mode bus to one or more predetermined time slots in the time-division multiplexing line. Conversely, it retrieves the fixed-length cell data mapped to the time slots and outputs the data to the asynchronous transfer mode bus.

A multiplexing/demultiplexing circuit (507) is connected to each transmission convergence layer terminating circuit, and also to a time-division multiplexing bus slot. It multiplexes and outputs to the time-division multiplexing bus the time slot to which fixed-length cell data is mapped after being input from each transmission convergence layer terminating circuit. Conversely, the multiplexing/ demultiplexing circuit (507) demultiplexes the time slot, to which each fixed-length cell data output to each transmission convergence layer terminating circuit is mapped, from the time slot to which the fixed-length cell data input from the time-division multiplexing bus is mapped.

When the communications path of the transmitted fixed-length cell data as time slots to which the fixed-length cell data is mapped in the time-division multiplexing line is expanded, the fixed-length cell data corresponding to a plurality of paths can be mapped to the time-division data in the specified time slot in the time-division multiplexing line only by connecting the hybrid process package device. having the above described configuration of a necessary scale to an asynchronous transfer mode bus slot and a time-division multiplexing bus slot (and control bus slot).

The above described configuration according to the present invention can be designed as a low-speed data TDM multiplexing and CLAD package device (701) which realizes one of various process package devices, and can comprise the following multiplexing/demultiplexing circuit and cell assembly/disassembly layer terminating circuit.

First, the multiplexing/demultiplexing circuit (TDM multiplexing circuit 702) can be connected to a time-division multiplexing bus slot, whereby it multiplexes and outputs plural pieces of low rate media data (low-rate data) as one or more pieces of time-division data. Conversely, the multiplexing/demultiplexing circuit demultiplexes plural pieces of low-rate media data from one or more pieces of input time-division data, and outputs the resultant data to the time-division multiplexing bus.

Then, the cell assembly/disassembly layer terminating circuit (SAR layer terminating circuit 703) can be connected to an asynchronous transfer mode bus slot, sequentially converts one or more pieces of time-division data input from the multiplexing/demultiplexing circuit into a fixed-length cell, and outputs the cell to the asynchronous transfer mode bus. Conversely, it sequentially converts a fixed-length cell input through the asynchronous transfer mode bus into one or more pieces of time-division data, and outputs the data to the multiplexing/demultiplexing circuit.

Low-rate media data can be time-division multiplexed and mapped to a fixed-length cell only by connecting the hybrid process package device having the above described configuration of a necessary scale to an asynchronous transfer mode bus slot and a time-division multiplexing bus slot (and control bus slot).

The above described configuration according to the present invention can be designed as a hybrid process package device (1101) which realizes one of various process package devices, and can comprise the following voice compressing coder-decoder circuit and cell assembly/ disassembly layer terminating circuit.

First, a voice compressing coder-decoder circuit (CODEC. 1102) can be connected to a time-division multiplexing bus slot, compresses, encodes, and outputs the voice data input from the time-division multiplexing bus. Conversely, it decodes the input compressed-encoded voice data, and outputs the data to the time-division multiplexing bus.

Then, a cell assembly/disassembly layer terminating circuit (SAR layer terminating circuit 1103) can be connected to an asynchronous transfer mode bus slot, sequentially converts the compressed and encoded voice data input from the voice compressing coder-decoder circuit into a fixed-length cell, and outputs the cell to the asynchronous transfer mode bus. Conversely, the SAR layer terminating circuit 1103 sequentially converts the fixed-length cell input from the asynchronous transfer mode bus into compressed and encoded voice data, an outputs the data to the voice compressing coder-decoder circuit.

With this configuration, the voice data for each channel can be compressed, encoded, and mapped to a fixed-length cell only by connecting the hybrid process package device of an appropriate scale to the purpose to the asynchronous transfer mode bus slot and the time-division multiplexing bus slot (and control bus slot).

Since the no-voice detection information for stopping data from being put in a cell in the no-voice period detected by the voice compressing coder-decoder circuit can be easily transmitted to the cell assembly/disassembly layer terminating circuit in the same package device, the control process can be prevented from becoming too complicated.

Finally, as an extended configuration according to the present invention, one fixed-length cell data time-division data hybrid multiplexing device or a fixed-length cell data processing device (1502) for exclusively processing fixed-length cell data, and another one or more fixed-length cell data/time-division data hybrid multiplexing devices (1501) can be designed to be interconnected by an asynchronous transfer mode line (ATM exclusive line 1503) for transmitting fixed-length cell data through an asynchronous transfer mode line port package device (line port 309) connected to an asynchronous transfer mode bus slot in each of the fixed-length cell data/time-division data hybrid multiplexing devices.

With the above described extended configuration, the functions can be easily improved stepwise, the devices can be quickly connected, the number of lines of connected signals can be reduced, and each device can be remotely provided.

In this case, the asynchronous transfer mode buses of the devices are connected through the asynchronous transfer mode interface. The communications of the control information between the devices can be easily realized by the standardized asynchronous transfer mode interface. Therefore, the control process can be prevented from becoming too complicated.

BRIEF DESCRIPTION OF THE DRAWINGS

Other objects and features of the present invention can be easily recognized by a person of ordinary skill in the art according to the attached drawings and the descriptions of the preferred embodiments of the present invention.

FIG. 5 shows the configuration according to the first operation example according to a preferred embodiment of the present invention;

FIG. 6 is an explanatory view of the first operation example according to a preferred embodiment of the present invention;

FIG. 14 is an explanatory view of the fourth operation example according to a preferred embodiment of the present invention;

DESCRIPTION OF THE PREFERRED EMBODIMENTS

The preferred embodiments of the present invention are described below in detail by referring to the attached drawings.

Figure 3:
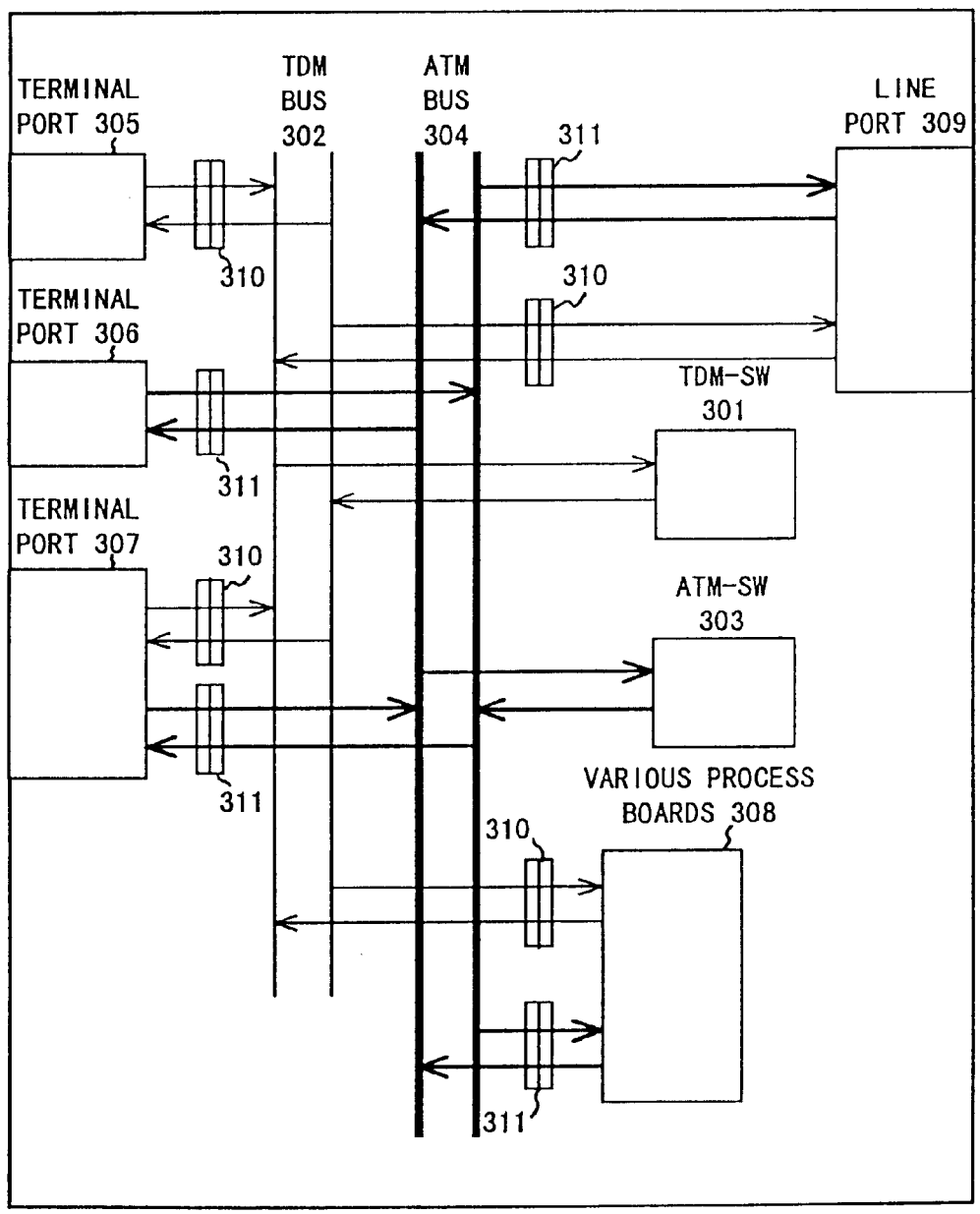
FIG. 3 shows the basic configuration according to a preferred embodiment of the present invention.

Basic Configuration According to the Preferred Embodiments of the Present Invention FIG. 3 shows the basic configuration according to a preferred embodiment of the ATM-TDM hybrid multiplexing device according to the present invention.

According to a preferred embodiment of the present invention, the feature of the present invention is a single unit comprising the TDM bus 302 for transferring multiplexed time-division data, the TDM switch (TDM-SW) 301, connected to the TDM bus 302, for exchanging multiplexed time-division data in the TDM bus 302, the ATM bus 304 for transmitting an ATM cell, and the ATM switch (ATM-SW) 303, connected to the ATM bus 304, for exchanging an ATM cell in the ATM bus 304.

Furthermore, the preferred embodiment of the present invention comprises one or more TDM bus slots 310, connected to the TDM bus 302, having each of the terminal port 305 or 307, the line port 309, and the various process boards 308 implemented as a package unit; and one or more ATM bus slots 311, connected to the ATM bus 304, having each of the terminal port 306 or 307, the line port 309, and the various process boards 308 implemented as a package unit. This configuration is also a feature of the present invention.

The terminal port 305 is a package device connected to the TDM bus slot 310, and accommodates various terminals which are TDM-terminated. The terminal port 306 is a package device connected to the ATM bus slot 311, and accommodates various terminals which are ATM-terminated (including the TDM communications). The terminal port 307 is a package device connected to both of the TDM bus slot 310 and the ATM bus slot 311, and accommodates various terminals which are TDM-terminated and ATM-terminated in a mixed manner.

Thus, the present embodiment comprises the TDM bus slot 310 and the ATM bus slot 311 to optionally implement in a single unit the terminal port 305 for TDM-termination, the terminal port 306 for ATM termination, and the terminal port 307 for TDM- and ATM- termination.

Furthermore, the line port 309 shown in FIG. 3 can connect the following three types of line port package devices.

The first line port package device is connected to only the TDM bus slot 310, and terminates the STM exclusive line. An ATM cell is not transmitted, but the TDM communications can only be realized in the STM exclusive line terminated by the first line port package: device. The first line port package device is provided when the ATM-TDM hybrid multiplexing device having the configuration shown in FIG. 3 is implemented with the TDM communications system included as is using the existing STM exclusive line.

The second line port package device is connected to both of the TDM bus slot 310 and the ATM bus slot 311, and has the functions of-terminating the STM exclusive line; mapping a portion of the time slot output to the STM exclusive line to an ATM cell input/output to the ATM bus 304; and inputting/outputting to the TDM bus 302 another portion of the time-division data input/output to the STM exclusive line. The second line port package device is provided when the ATM-TDM hybrid multiplexing device having the configuration shown in FIG. 3 functions in such a way that the TDM communications system and the ATM communications system can co-exist using the existing STM exclusive line (refer to FIGS. 5 and 6 described later, or FIGS. 13 and 14, etc.).

The third line port package device is connected to only the ATM bus slot 311, and terminates the ATM exclusive line. Time-division data is not transmitted, but the ATM communications can only be realized in the ATM exclusive line terminated by the third line port package device. The third line port package device is provided when the ATM-TDM hybrid multiplexing device having the configuration shown in FIG. 3 is implemented with the ATM communications system included using high-speed ATM exclusive line of a transmission rate equal to or higher than, for example, 150 megabit/sec.

Thus, according to the present embodiment of the present invention, the communications system can be easily modified using the same ATM-TDM hybrid multiplexing device by connecting to one or both of the TDM bus slot 310 and the ATM bus slot 311 the package device having a suitable line port 309.

Then, the various process boards 308 shown in FIG. 3 can connect the following three types of process package devices.

The input terminal and the output terminal of the first process package device can be connected only to the TDM bus slot 310. The time-division data input through the TDM bus 302 is processed and output to the TDM bus 302 again. The first process package device compresses and encodes, for example, the original voice time-division data. Conversely, it has the voice CODEC function of decoding the original voice time-division data from the compressed and encoded voice time-division data (refer to FIGS. 13 and 14 described later).

The input terminal and the output terminal of the second process package device are connected to only the ATM bus slot 311, and the second process package device processes the ATM cell input through the ATM bus 304 and outputs it to the ATM-SW 303 again. The second process package device terminates the ATM cell to transmit various control information to and from, for example, another ATM node device.

The third process package device is simultaneously connected to the TDM bus slot 310 and the ATM bus slot 311, and processes and interconverts the time-division data in the TDM bus 302 and the ATM cell in the ATM bus 304. The third process package device realizes the functions of mapping the ATM cell in the ATM bus 304 to the time-division data in the TDM bus 302 (refer to FIGS. 5 and 6 described later); multiplexing, demultiplexing, and mapping to an ATM cell the low-rate media data such as modem data, FAX data, etc. (refer to FIGS. 7 through 10); or compressing, encoding, decoding, and mapping to an ATM cell the original voice time-division data in the TDM bus 302 (refer to FIGS. 11 and 12), etc.

Thus, according to the preferred embodiment of the present invention, the function realized by the ATM-TDM hybrid multiplexing device can be flexibly extended only by connecting the package device of the various suitable process boards 308 to one or both of the TDM bus slot 310 and the ATM bus slot 311.

Figure 4:
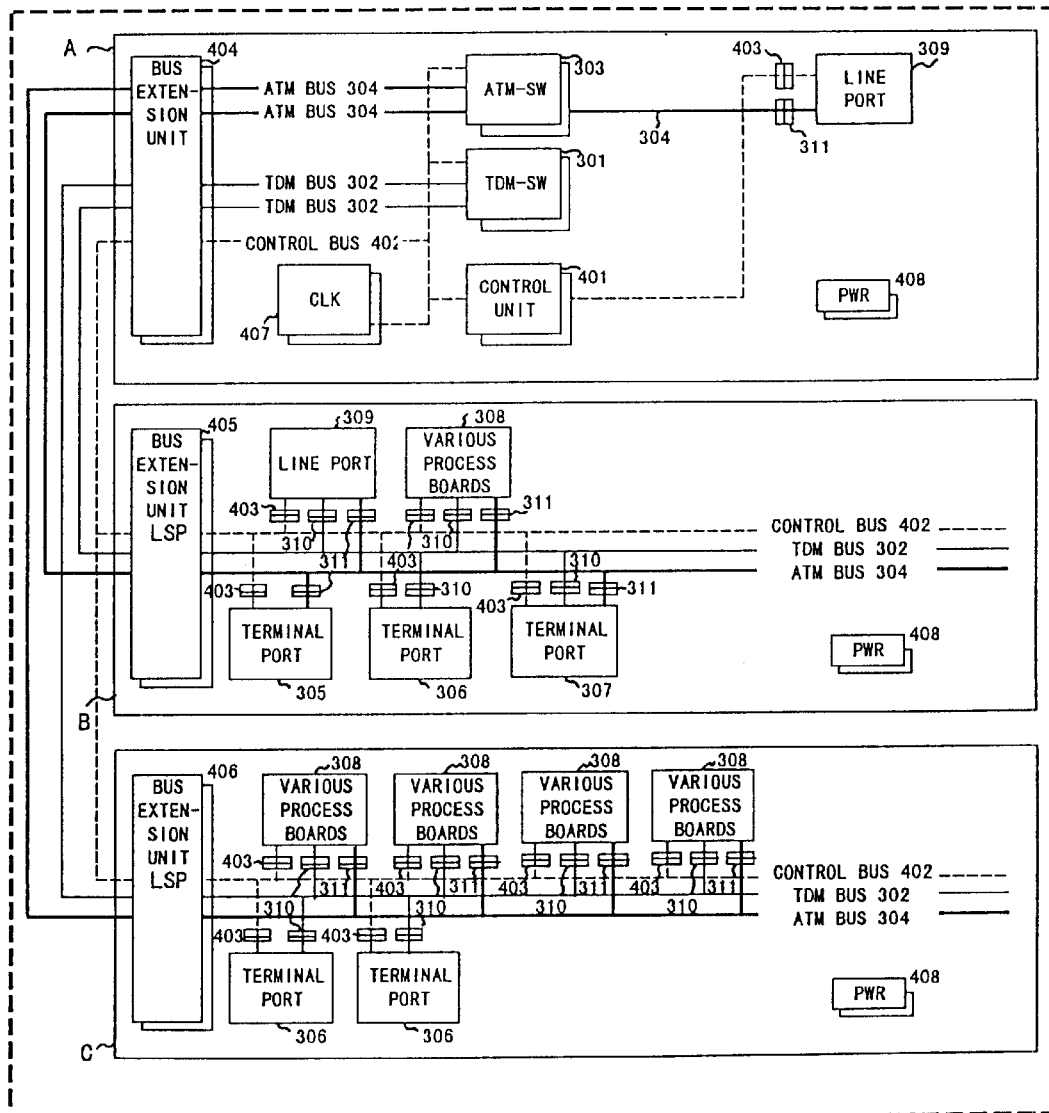
FIG. 4 shows an example of the configuration of the units according to a preferred embodiment of the present invention.

FIG. 4 shows an example of the configuration of the unit according to a preferred embodiment of the ATM-TDM hybrid multiplexing device shown in FIG. 3. In FIG. 4, a unit assigned the same number as a unit shown in FIG. 3 has the same function as the unit shown in FIG. 3.

According to this example of the configuration of the unit, three units A, B, and C are respectively provided with the TDM bus 302, the ATM bus 304, and the control bus 402, and the buses of each unit are interconnected by bus extension units 404, 405, and 406.

The unit A is provided with the TDM-SW 301 and the ATM-SW 303, and the line port 309 functioning as the above described third line port package device is connected to the ATM bus slot 311.

Each package device of the above described terminal port 305, 306, or 307, the line port 309 functioning as the above described second line port package device, and one of the various process boards 308 functioning as the above described third process package device, are connected to one or both of the ATM bus slot 311 and the TDM bus slot 310 of the unit B.

The package of the above described terminal port 306 and a plurality of the various process boards 308 functioning as the above described third process package device are connected to one or both of the ATM bus slot 311 and the TDM bus slot 310 of the unit C.

The unit A is also connected to the control bus 402, and is provided with a control unit 401 for collectively controlling the operations of the ATM-TDM hybrid multiplexing device realized by the units A through C. The above described control unit 401 controls the TDM-SW 301 and the ATM-SW 303, and collectively controls the line port 309 in the above described unit A, the line port 309 in the unit B, the terminal port 305, 306, or 307 in the unit B and one of the various process boards 308, and two terminal ports 306 in the unit C and four of the various process boards 308, through the control bus slot 403 connected to the control bus 402.

The above described collective control can be realized by the configuration in which the line port 309, the terminal ports 305 through 307, and the various process boards 308 are connected as package devices through the TDM bus slot 310, the ATM bus slot 311, and the control bus slot 403. As a result, the problem that the control process relating to the second conventional technology shown in FIG. 2 becomes necessarily complicated can be solved.

A clock generator unit (CLK) 407 in the unit A provides a clock for the TDM-SW 301, the ATM-SW 303, the control unit 401, the line port 309, the terminal ports 305 through 307, the various process boards 308, etc. through the control bus 402. Each of the units A through C is provided with a power source unit (PWR) 408.

First Example of the Operations According to the Preferred Embodiment of the Present Invention FIG. 5 shows the configuration of the first example of the operations according to the preferred embodiment of the present invention. FIG. 6 is an explanatory view of the configuration. In FIGS. 5 and 6, a unit assigned the same number as a unit shown in FIG. 3 has the same function as the unit shown in FIG. 3.

In FIGS. 5 and 6, the line port 309 functions as the above described second line port package device. The ATM-TDM hybrid multiplexing device having the configuration shown in FIG. 5 is designed to function such that the TDM communications system and the ATM communications system can be operated in a mixed manner using a trunk line 504 which is an existing STM exclusive line.

First, the line port 309 comprises the physical layer terminating circuit 501, the TC layer terminating circuit 502, and the multiplexing/demultiplexing circuit 503.

The physical layer terminating circuit 501 terminates the physical layer of the trunk line 504.

The TC (transmission convergence) layer terminating circuit 502 is connected to the ATM bus slot 311, maps the ATM cell input from the ATM bus 304 through the ATM bus slot 311 to predetermined one or more time slots in the trunk line 504, and outputs it to the multiplexing/demultiplexing circuit 503. Conversely, the TC layer terminating circuit 502 retrieves the ATM cell from the time slots input from the multiplexing/demultiplexing circuit 503, and outputs the cell to the ATM bus 304 through the ATM bus slot 311.

The multiplexing/demultiplexing circuit 503 is connected to the TC layer terminating circuit 502 and simultaneously to the TDM bus slot 310, multiplexes the time slot input from the TC layer terminating circuit 502 and the time slot input from the TDM bus 302 through the TDM bus slot 310, and outputs the multiplexed time slots to the trunk line 504 through the physical layer terminating circuit 501. Conversely, the multiplexing/demultiplexing circuit 503 demultiplexes the time slot output to the TC layer terminating circuit 502 and the time slot output to the TDM bus 302 through the TDM bus slot 310 from the multiplexed time slot input from the trunk line 504 through the physical layer terminating circuit 501.

Then, plural port TC layer process package device 505 is designed such that one of the various process boards 308 shown in FIG. 3 functions as the above described third process package device, and comprises one or more TC layer terminating circuits 506 and one multiplexing/demultiplexing circuit 507.

Each TC layer terminating circuit 506 has the function of the TC layer terminating circuit 502 in the line port 309, and is connected to one ATM bus slot 311. Each TC layer terminating circuit 506 maps the ATM cell input from the ATM bus 304 through the ATM bus slot 311 to predetermined one or more time slots in the trunk line 504, and outputs the cell to the multiplexing/demultiplexing circuit 507. Conversely, the TC layer terminating circuit 506 retrieves the ATM cell from the time slot input from the multiplexing/demultiplexing circuit 507, and outputs the cell to the ATM bus 304 through the ATM bus slot 311.

The multiplexing/demultiplexing circuit 507 has the same function as the multiplexing/demultiplexing circuit 503 in the line port 309, and is connected to the TC layer terminating circuit 506 and also to the TDM bus slot 310. It multiplexes each time slot input from the TC layer terminating circuit 506, outputs the multiplexed time slot to the TDM bus 302 through the TDM bus slot 310. Conversely, the multiplexing/demultiplexing circuit 507 demultiplexes the time slot output to each TC layer terminating circuit 506 from the multiplexed time slot input from the TDM bus 302 through the TDM bus slot 310.

Described below are the operations of the first example according to the present invention having the above described configuration.

In the first operation example, the ATM-TDM hybrid multiplexing device with the configuration shown in FIG. 5 is designed to include the TDM communications system and the ATM communications system in a mixed manner using the trunk line 504 which is an existing STM exclusive line.

In this case, when the communications path of the ATM cell contains only a one-way path, the ATM cell in the path is mapped to only one time slot group and is transmitted in the trunk line 504, and other time slot groups in the trunk line 504 are used in transmitting each piece of time-division data for the TDM communications.

In this case, the plural port TC layer process package device 505 shown in FIG. 5 is not required.

In FIG. 6, the ATM cell input from the ATM-SW 303 to the line port 309 through the ATM bus 304 and the ATM bus slot 311, not shown in FIG. 6, is mapped by the TC layer terminating circuit 502 to predetermined one or more time slots in the trunk line 504, and then output to the multiplexing/demultiplexing circuit 503. The multiplexing/demultiplexing circuit 503 multiplexes the time-division data input from the TC layer terminating circuit 502 with the time-division data input for the TDM communications to the line port 309 from the TDM-SW 301 through the TDM bus 302 and the TDM bus slot 310, not shown in FIG. 6, and outputs the multiplexed time-division data to the trunk line 504 through the physical layer terminating circuit 501.

On the other hand, the multiplexed time-division data input from the trunk line 504 through the physical layer terminating circuit 501 is demultiplexed into the time slot output to the TC layer terminating circuit 502 by the multiplexing/demultiplexing circuit 503 and the time slot output from the TDM bus slot 310 to the TDM-SW 301 through the TDM bus 302. The ATM cell is retrieved by the TC layer terminating circuit 502 from the time slot input from the multiplexing/demultiplexing circuit 503 to the TC layer terminating circuit 502, and is then output to the ATM-SW 303 through the ATM bus slot 311 and the ATM bus 304.

Figure 1:
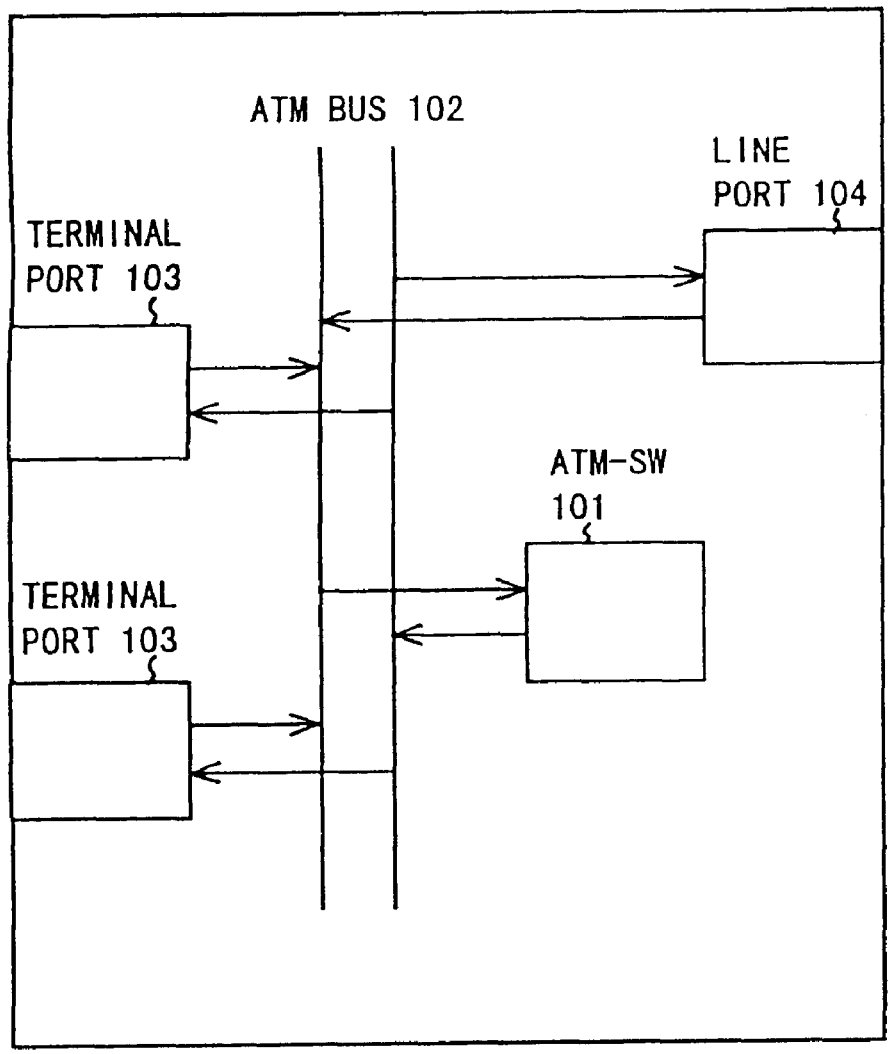
FIG. 1 shows the configuration according to the first conventional technology (device having only an ATM bus)
Figure 2:
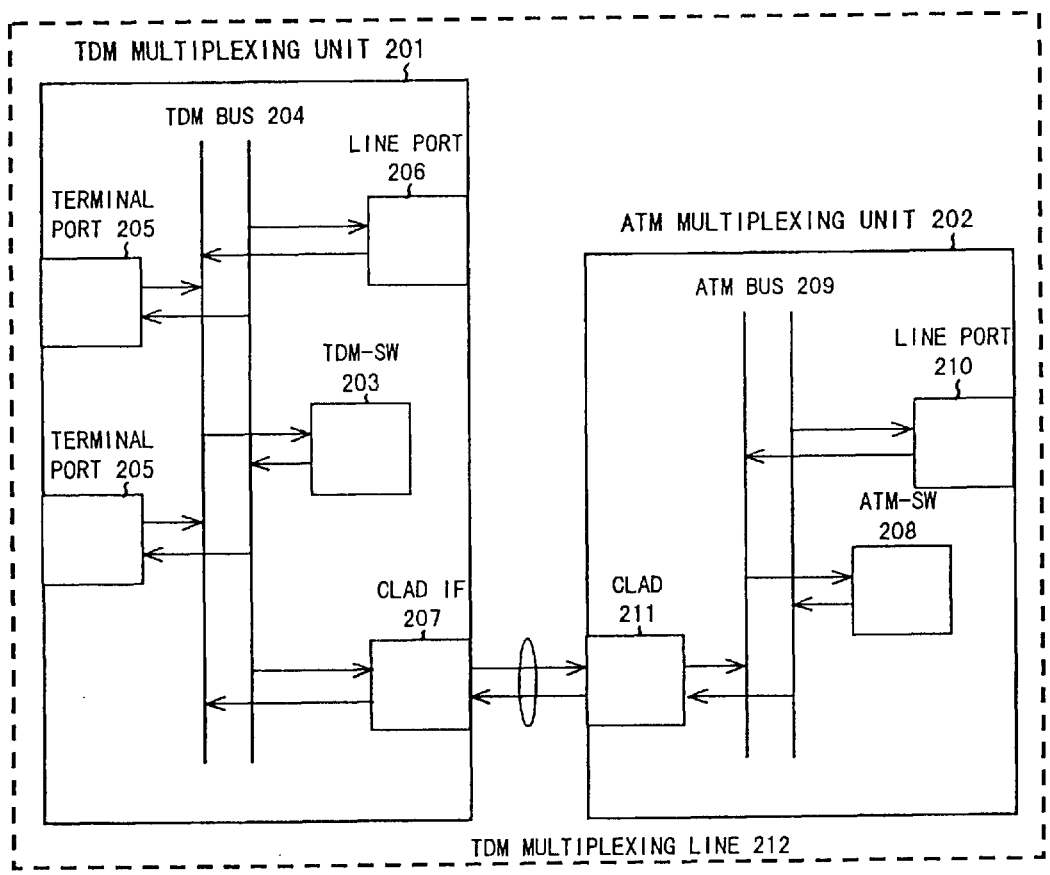
FIG. 2 shows the configuration according to the second conventional technology (device in which the ATM multiplexing unit is functionally separated from the TDM multiplexing unit)

Thus, in the first example of the operations according to the preferred embodiment of the present invention, a pair of the line port 210 connected to the ATM multiplexing unit 202 and the terminal ports 205 connected to the TDM multiplexing unit 201 in the case of the second conventional technology shown in FIG. 2 are not required. The ATM cell for one path can be mapped to the time-division data for a specified time slot in the trunk line 504 only by connecting the package device of the line port 309 having the configuration shown in FIG. 5 to the ATM bus slot 311 and the TDM bus slot 310.

Next, if there are a plurality of paths set as the communications paths of ATM cells, an ATM cell in each path is mapped to a plurality of predetermined time slots in the trunk line 504.

In this case, a plurality of port TC layer process package devices 505 shown in FIG. 5 are used.

First, in FIG. 6, the ATM cell for the first communications path is, as described above, communicated along the path of: ATM-SW 303←→ATM bus 304←→ATM bus slot 311, not shown in FIG. 6←→TC layer terminating circuit 502 in line port 309←→multiplexing/demultiplexing circuit 503 in line port 309←→physical layer terminating circuit 501 in line port 309←→first time slot group in trunk line 504.

Then, in FIG. 6, the ATM cell for each of the second and subsequent communication paths is communicated along the path of: ATM-SW 303←→ATM bus 304←→ATM bus slot 311, not shown in FIG. 6←→one TC layer terminating circuit 506 in hybrid process package device 505←→multiplexing/demultiplexing circuit 507 in package device 505←→TDM bus slot 310, not shown in FIG. 6←→TDM bus 302←→TDM-SW 301←→TDM bus 302←→TDM bus slot 310, not shown in FIG. 6←→multiplexing/demultiplexing circuit 503 in line port 309←→physical layer terminating circuit 501 in line port 309←→one or more predetermined time slot groups in trunk line 504.

Thus, in the first example of the operations according to the preferred embodiment of the present invention, when the communications paths for ATM cells are added, there is no need to add a pair of the line port 210 connected to the ATM multiplexing unit 202 and the terminal port 205 connected to the TDM multiplexing unit 201 provided in the case of the second conventional technology shown in FIG. 2. The ATM cell for a plurality of paths can be mapped to specified time slot groups in the trunk line 504 only by connecting a necessary number of port TC layer process package devices 505 having the configuration shown in FIG. 5 to the ATM bus slot 311 and the TDM bus slot 310.

In the first example of the operations according to the preferred embodiment of the present invention, the communications settings of the line port 309 and a plurality of hybrid process package devices 505 can be collectively controlled by the control unit 401 shown in FIG. 4 through the control bus 402 and the control bus slot 403. Therefore, the control process can be prevented from becoming complicated.

Figure 7:
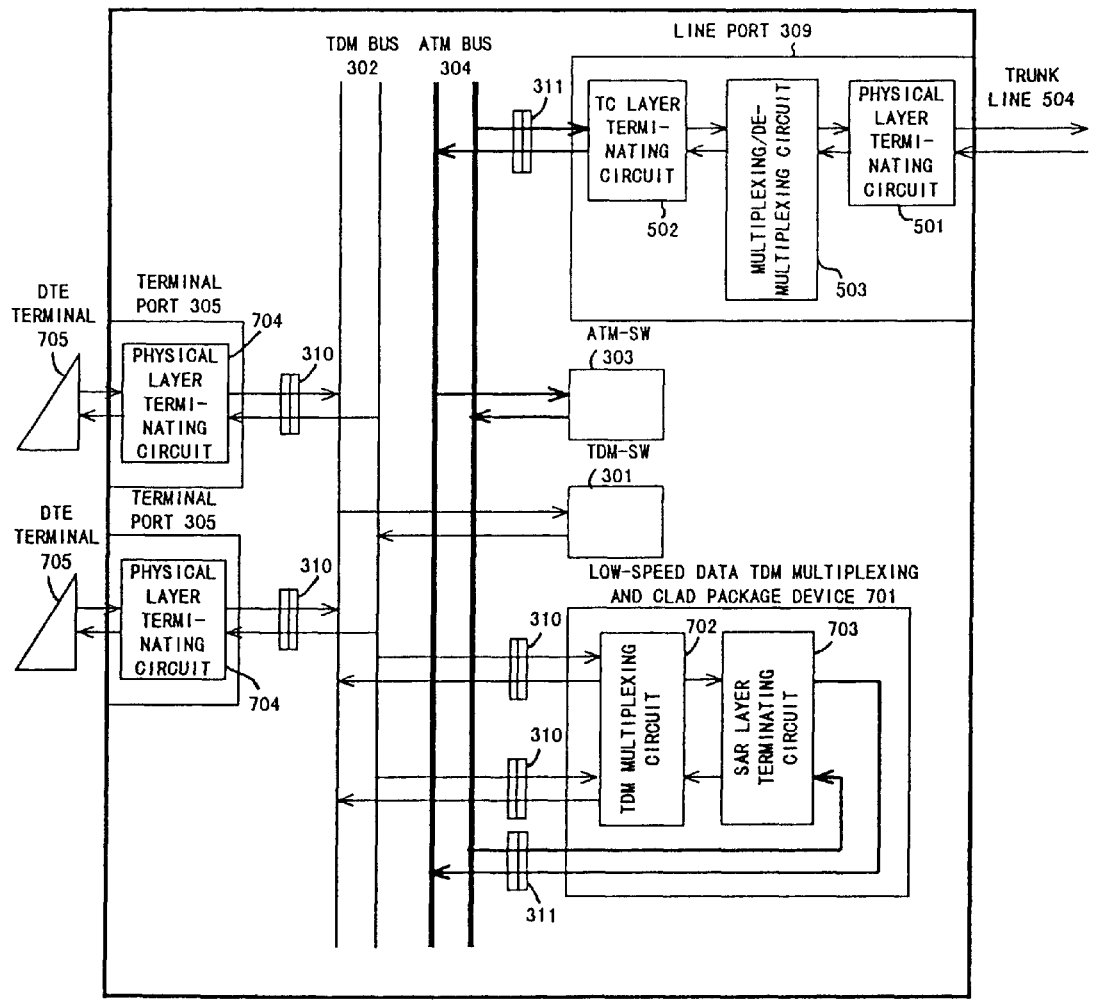
FIG. 7 shows the configuration according to the second operation example according to a preferred embodiment of the present invention.
Figure 8:
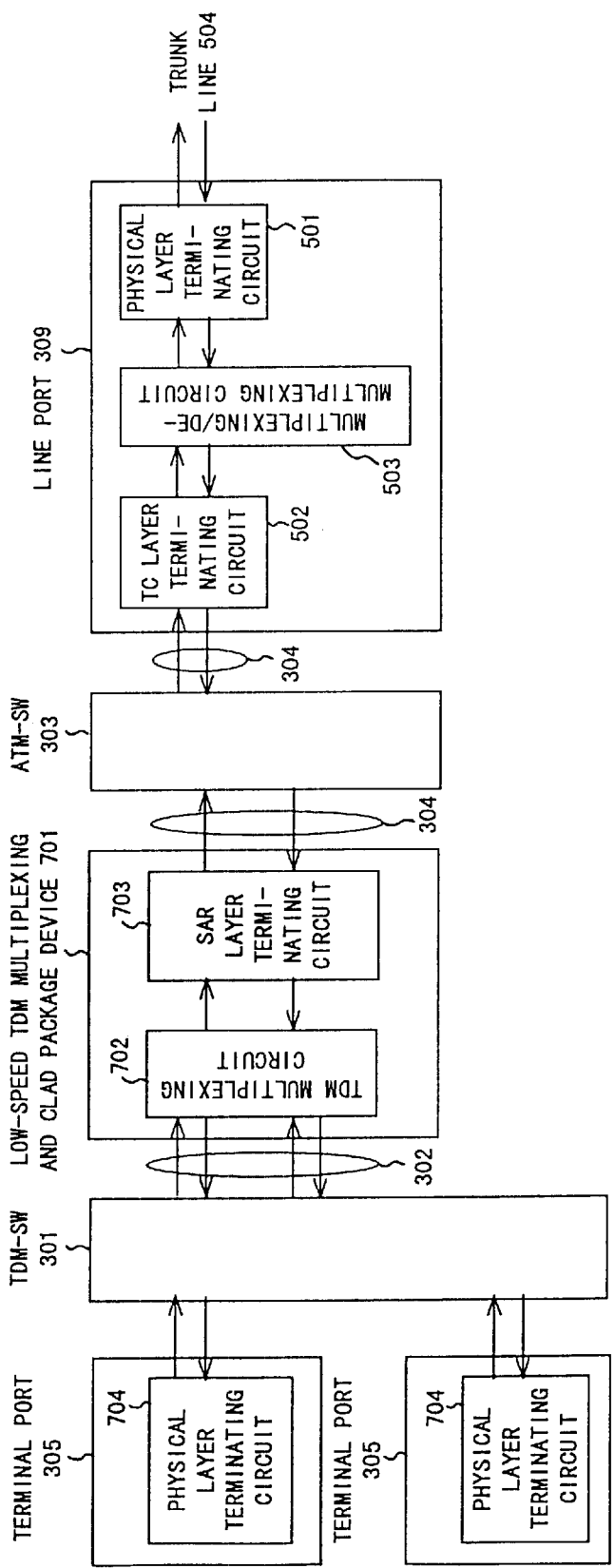
FIG. 8 is an explanatory view (1) of the second operation example according to a preferred embodiment of the present invention.
Figure 9:
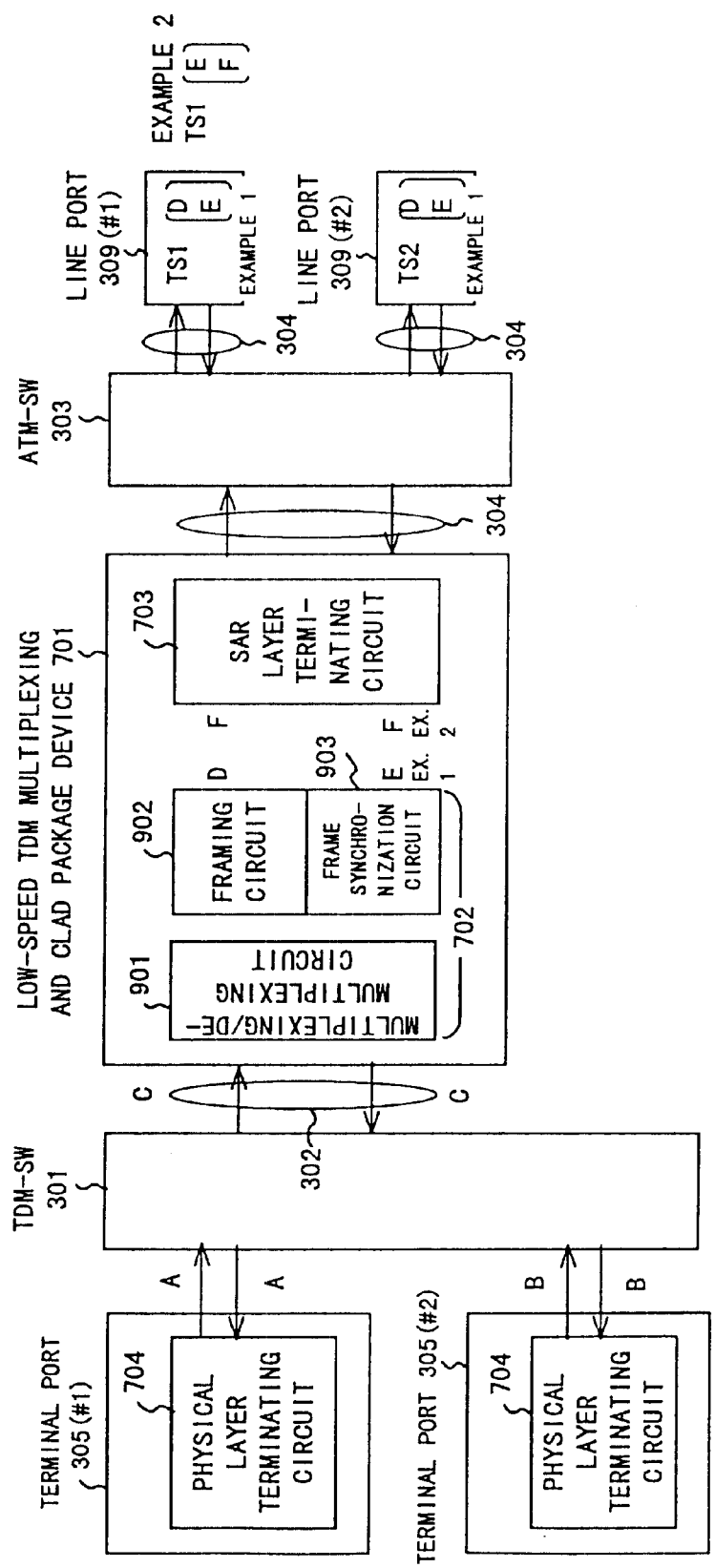
FIG. 9 is an explanatory view (2) of the second operation example according to a preferred embodiment of the present invention.
Figure 10:
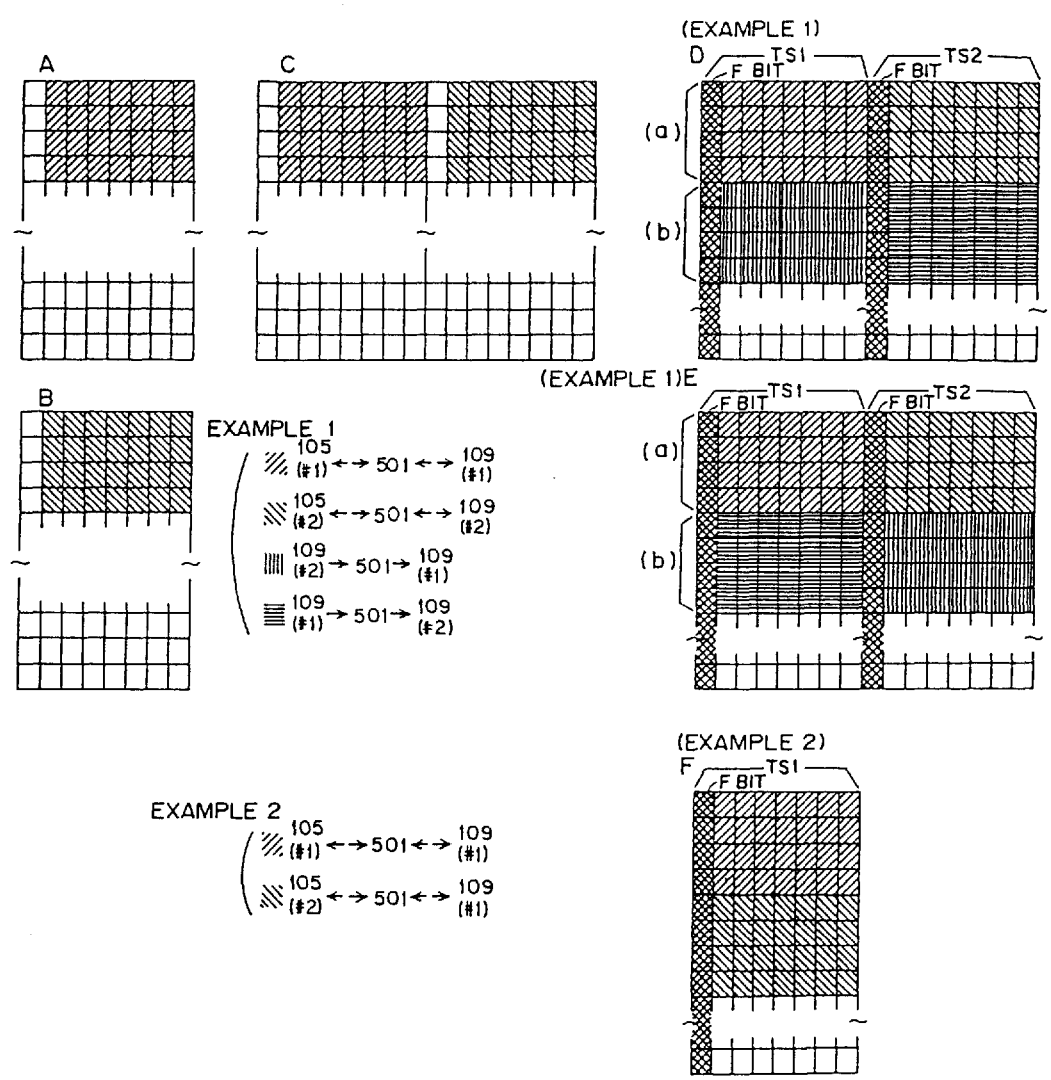
FIG. 10 shows the format of the data shown in FIG. 9.

Second Example of the Operations According to the Preferred Embodiment of the Present Invention FIG. 7 shows the configuration of the second example of the operations according to the preferred embodiment of the present invention. FIGS. 8 through 10 are explanatory views of the configuration. In FIGS. 7 through 10, a unit assigned the same number as a unit shown in FIG. 3 or 5 has the same function as the unit shown in FIG. 3 or 5.

In FIGS. 7 through 9, the terminal port 305 is connected to the TDM bus 302 through the TDM bus slot 310. A physical layer terminating circuit 704 in the terminal port 305 terminates a DTE terminal 705 for communicating low-speed data which is low-rate media data.

Then, a low-speed data TDM multiplexing and CLAD package device 701 is designed such that each of the various process boards 308 shown in FIG. 3 can function as the above described third process package device; and comprises the TDM multiplexing circuit 702 and the SAR layer terminating circuit 703

The TDM multiplexing circuit 702 is connected to a plurality of TDM bus slots 310, multiplexes the plural pieces of low-speed data as one or more time-division data input from the TDM bus 302 through each of the TDM bus slots 310, and outputs the data to the SAR layer terminating circuit 703. Conversely, the TDM multiplexing circuit 702 demultiplexes the plural pieces of low-speed data from one or more pieces of time-division data input from the SAR layer terminating circuit 703, and outputs the demultiplexed data to the TDM bus 302 through each of the TDM bus slots 310.

The SAR layer terminating circuit 703 terminates a SAR layer (segmentation and reassembly layer) in the ATM communications. It is connected to the ATM bus slot 311, sequentially generates a SAR protocol data unit (SAR-PDU) from one or more pieces of time-division data input from the TDM multiplexing circuit 702, sequentially converts the unit into an ATM cell, outputs the cell to the ATM bus 304 through the ATM bus slot 311. Conversely, the SAR layer terminating circuit 703 sequentially retrieves the SAR-PDU from the ATM cell input from the ATM bus 304 through the ATM bus slot 311, then sequentially converts the retrieved SAR-PDU into one or more pieces of time-division data, and outputs it to the TDM multiplexing circuit 702.

Next, in FIGS. 7 through 9, the line port 309 has the same configuration as in the case shown in FIG. 5. When the multiplexing access service of the trunk line 504 is not used, the line port 309 does not have to be connected to the TDM bus slot 310 as shown in FIG. 7.

Described below is the second example of the operations with the above described configuration according to the present invention.

In the second example of the operations, plural pieces of low-speed data for a plurality of DTE terminals 705 terminated by a plurality of terminal ports 305 are input from the TDM-SW 301 to the TDM multiplexing circuit 702 in the low-speed data TDM multiplexing and CLAD package device 701 through the TDM bus 302 and the TDM bus slot 310, not shown in FIG. 8, as shown in FIG. 8.

The TDM multiplexing circuit 702 multiplexes plural pieces of low-speed data, as one or more pieces of time-division data input from the TDM bus 302 through each TDM bus slot 310, and outputs the data to the SAR layer terminating circuit 703.

The SAR layer terminating circuit 703 sequentially generates the SAR-PDU from one or more pieces of time-division data input from the TDM multiplexing circuit 702, sequentially converts it into an ATM cell, and outputs the ATM cell to the ATM bus 304 through the ATM bus slot 311.

The ATM cell is first switched by the ATM-SW 303, and is then input from the ATM bus 304 to the TC layer terminating circuit 502 in the line port 309 through the ATM bus slot 311.

The TC layer terminating circuit 502 maps the ATM cell mentioned above to one or more predetermined time slots in the trunk line 504, and then outputs the cell to the multiplexing/demultiplexing circuit 503. The multiplexing/demultiplexing circuit 503 outputs the time slot, to which the above described ATM cell is mapped at a timing for one or more time slots in the trunk line 504, to the trunk line 504 through the physical layer terminating circuit 501.

On the other hand, one or more predetermined time slots to which the ATM cell input from the trunk line 504 through the physical layer terminating circuit 501 is mapped are retrieved by the multiplexing/demultiplexing circuit 503, and then output to the TC layer terminating circuit 502.

The TC layer terminating circuit 502 retrieves the ATM cell from the above described time slot, and output it to the ATM-SW 303 through the ATM bus slot 311 and the ATM bus 304.

The ATM-SW 303 transfers the ATM cell to the low-speed data TDM multiplexing and CLAD package device 701.

The SAR layer terminating circuit 703 in the low-speed data TDM multiplexing and CLAD package device 701 sequentially retrieves the SAR-PDU from the ATM cell from the ATM input from the ATM bus 304 through the ATM bus slot 311, sequentially converts it into one or more pieces of time-division data, and output the data to the TDM multiplexing circuit 702.

The TDM multiplexing circuit 702 demultiplexes plural pieces of low-speed data from one or more pieces-of time-division data input from the SAR layer terminating circuit 703, and outputs the data from each of the TDM bus slots 310 to the TDM-SW 301 through the TDM bus 302.

The TDM-SW 301 transfers the low-speed data to the terminal ports 305.

Each of the terminal ports 305 transfers the above described low-speed data input from the TDM bus 302 through the TDM bus slot 310 to the DTE terminal 705 accommodated in each terminal port 305.

FIGS. 9 and 10 show examples of the multiplexing process for low-speed data.

As shown in FIG. 9, and as example 1, the DTE terminal 705, which is connected to the terminal port 305 (#1) and is not shown in FIG. 9, communicates low-speed data along the path belonging to the trunk line 504 with which the line port 309 (#1) is terminated. The DTE terminal 705, which is connected to the terminal port 305 (#2) and is not shown in FIG. 9, communicates low-speed data along the path belonging to the trunk line 504 with which the line port 309 (#2) is terminated. Furthermore, another piece of low-speed data is relayed between the line port 309 (#1) and the line port 309 (#2).

In this case, the low-speed data input and output in the TDM bus 302 of the terminal port 305 (#1) has, for example, the data format indicated as A shown in FIG. 10. Similarly, the low-speed data input or output in the TDM bus 302 of the terminal port 305 (#2) has, for example, the data format indicated as B shown in FIG. 10. When the data is input or output to the low-speed data TDM multiplexing and CLAD package device 701 through the TDM-SW 301, the low-speed data relating to the terminal port 305 (#1) and the low-speed data relating to the terminal port 305 (#2) are time-division multiplexed.

On the other hand, when the ATM cell relating to the low-speed data communications input from the ATM-SW 303 to the low-speed data TDM multiplexing and CLAD package device 701 through the ATM bus 304 and the ATM bus slot 311 is demultiplexed into time-division data by the SAR layer terminating circuit 703 in the low-speed data TDM multiplexing and CLAD package device 701, the time-division data has the data format indicated as, for example, E shown in FIG. 10.

The time-division data has the format of the multi-frame time-division multiplexed data. In the data format "E" shown in FIG. 10, bit F indicates a frame bit.

The time-division data of the time slot TS 1 in the multi-frame is transmitted from the line port 309 (#1), and the time-division data of the time slot TS 2 in the multi-frame is transmitted from the line port 309 (#2). In the time slot TS 1 in the frame area (a), the low-speed data returned from the line port 309 (#1) to the terminal port 305 (#1) is transmitted. In the time slot TS 2 in the frame area (a), the low-speed data returned from the line port 309 (#2) to the terminal port 305 (#2) is transmitted. Furthermore, in the time slot TS 1 in the frame area (b), the low-speed data relayed from the line port 309 (#1) to the line port 309 (#2) is transmitted. In the time slot TS 2 in the frame area (b), the low-speed data relayed from the line port 309 (#2) to the line port 309 (#1) is transmitted.

The TDM multiplexing circuit 702 in the low-speed data TDM multiplexing and CLAD package device 701 is formed by a multiplexing/demultiplexing circuit 901, a framing circuit 902, and a frame synchronization circuit 903 as shown in FIG. 9.

After the frame synchronization circuit 903 has established the frame synchronization for the time-division data having the data format indicated as, for example, E shown in FIG. 10 output from the SAR layer terminating circuit 703 as described above, the multiplexing/demultiplexing circuit 901 demultiplexes the time-division data for each path from the time-division data with the above described multi-frame configuration.

The multiplexing/demultiplexing circuit 901 transmits the time-division data demultiplexed from the time slot TS 1 and the time-division data demultiplexed from the time slot TS 2 in the frame area (a) from among the above described demultiplexed time-division data. These time-division data are transmitted in the data format shown as C in FIG. 10 to the TDM-SW 301 from the TDM bus slot 310 via the TDM bus 302.

The TDM-SW 301 transfers the above described time-division data to the terminal port 305 (#1) and the terminal port 305 (#2).

Furthermore, the multiplexing/demultiplexing circuit 901 and the framing circuit 902 assemble the time-division data with the multi-frame configuration having the data format indicated, for example, as D shown in FIG. 10, based on the above described demultiplexed time-division data and the time-division data, input from the TDM-SW 301 through the TDM bus 302 and the TDM bus slot 310, having the data format indicated, for example, as C shown in FIG. 10.

In the data format indicated as D shown in FIG. 10, the time-division data of the time slot TS 1 in the multi-frame is to be transferred to the line port 309 (#1), and the time-division data of the time slot TS 2 in the multi-frame is to be transferred to the line port 309 (#2). In the time slot TS 1 in the frame area (a), the low-speed data to be transferred from the terminal port 305 (#1) to the line port 309 (#1) is transmitted, and in the time slot TS 2 in the frame area (a) the low-speed data to be transferred from the terminal port 305 (#2) to the line port 309 (#2) is transmitted. Furthermore, in the time slot TS 1 in the frame area (b), the low-speed data to be relayed from the line port 309 (#2) to the line port 309 (#1) is transmitted, and in the time slot TS 2 in the frame area (b), the low-speed data to be relayed from the line port 309 (#1) to the line port 309 (#2) is transmitted.

The SAR layer terminating circuit 703 in the low-speed data TDM multiplexing and CLAD package device 701 generates the SAR-PDU addressed to the line port 309 (#1) and the ATM cell for storing the SAR-PDU from the time-division data of the time slot TS 1 from among the time-division data with the multi-frame configuration having the data format indicated, for example, as D shown in FIG. 10, generates the SAR-PDU addressed to the line port 309 (#2) and the ATM cell for storing the SAR-PDU from the time-division data of the time slot TS 2, and transmits them to the ATM-SW 303 from the ATM bus slot 311 via the ATM bus 304.

The ATM-SW 303 transfers the ATM cell storing the time-division data of the time slot TS 1 to the line port 309 (#1) based on the tag data added to the header portion, and transfers the ATM cell storing the time-division data of the time slot TS 2 to the line port 309 (#2) based on the tag data added to the header portion.

The TC layer terminating circuit 502 in each of the line ports 309 maps each of the received ATM cells to one or more predetermined time slots in the trunk line 504, and outputs it to the multiplexing/demultiplexing circuit 503. The multiplexing/demultiplexing circuit 503 outputs the above described time slot to the trunk line 504 through the physical layer terminating circuit 501 at a timing for one or more predetermined time slots in the trunk line 504. Thus, in the second example of the operations according to the preferred embodiment of the present invention, there is no need to provide a pair of the CLAD 211 connected to the ATM multiplexing unit 202 and the CLAD IF 207 connected to the TDM multiplexing unit 201 provided in the case of the second conventional technology shown in FIG. 2. The low-speed data can be time-division multiplexed and mapped to an ATM cell only by connecting the low-speed data TDM multiplexing and CLAD package device 701 having the configuration shown in FIG. 7 to the ATM bus slot 311 and the TDM bus slot 310.

In this case, the settings of the control information for mapping the time-division multiplexing data to an ATM cell and the exchange information about the relaying data can be collectively controlled by the control unit 401 shown in FIG. 4 through the control bus 402 and the control bus slot 403. Therefore, the control process can be prevented from becoming complicated.

In the second example of the operations according to the above described preferred embodiment of the present invention, the line port 309 does not necessarily have to terminate an STM exclusive line, but may terminate an ATM exclusive line.

Figure 11:
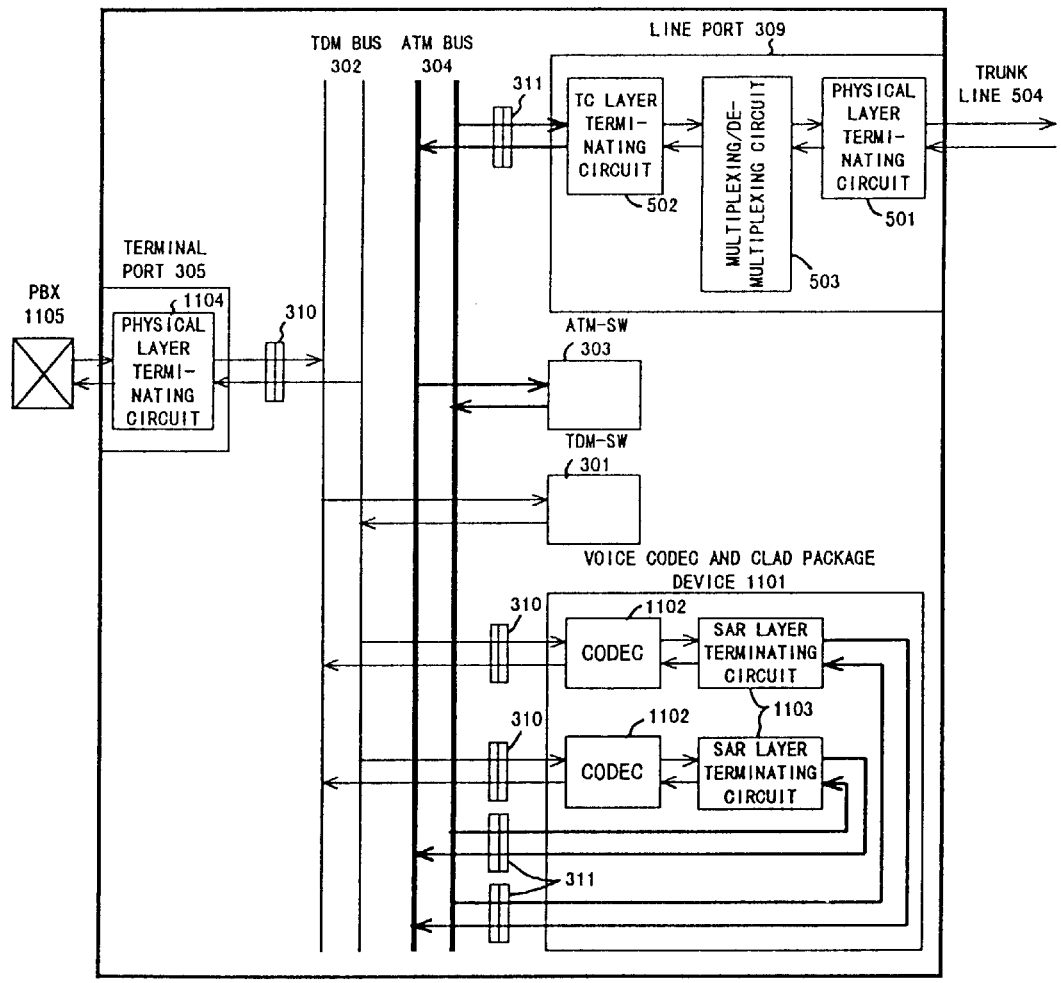
FIG. 11 shows the configuration according to the third operation example according to a preferred embodiment of the present invention.
Figure 12:
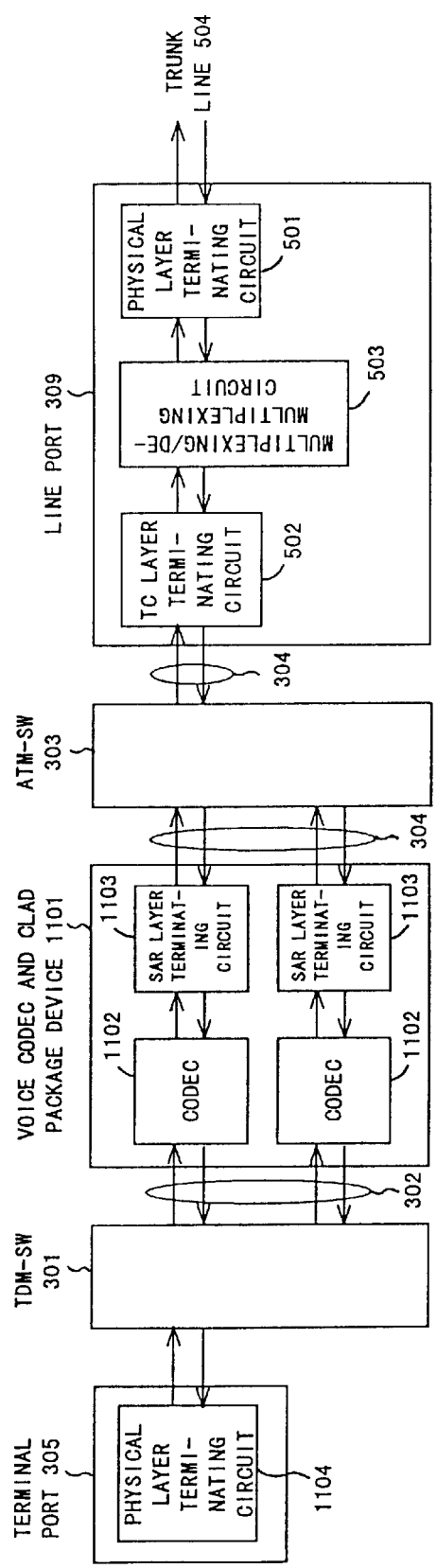
FIG. 12 is an explanatory view of the third operation example according to a preferred embodiment of the present invention.

Third Example of the Operations According to the Preferred Embodiment of the Present Invention FIG. 11 shows the configuration of the third example of the operations according to the preferred embodiment of the present invention. FIG. 12 is an explanatory view of the configuration. In FIG. 11 or 12, a unit assigned the same number as a unit shown in FIG. 3 or 5 has the same function as the unit shown in FIG. 3 or 5.

In FIG. 11 or 12, the terminal port 305 is connected to the TDM bus 302 through the TDM bus slot 310. A physical layer terminating circuit 1104 in the terminal port 305 terminates a private branch exchange (PBX) 1105 for controlling the exchange of an extension network.

Then, a voice CODEC and CLAD package device 1101 is designed such that each of the various process boards 308 shown in FIG. 3 can function as the above described third process package device, and has the configuration in which more than one set of the CODEC 1102 and the SAR layer terminating circuit 1103 can be provided.

The CODEC 1102 is connected to the TDM bus slot 310, and compresses, encodes, and outputs the original voice data input from the TDM bus 302 through the TDM bus slot 310 to the SAR layer terminating circuit 1103. Conversely, the CODEC 1102 decodes the original voice data from the compressed and encoded voice data input from the SAR layer terminating circuit 1103, and outputs the data to the TDM bus 302 through the TDM bus slot 310.

The SAR layer terminating circuit 1103 is connected to the ATM bus slot 311, sequentially generates the SAR-PDU from the compressed and encoded voice data input from the CODEC 1102, sequentially converts it into an ATM cell, and outputs the result to the ATM bus 304 through the ATM bus slot 311. Conversely, the SAR layer terminating circuit 1103 sequentially retrieves the SAR-PDU from the ATM cell input from the ATM bus 304 through the ATM bus slot 311, sequentially converts it into compressed and encoded voice data, and then outputs the result to the CODEC 1102.

Then, in FIG. 11 or 12, the line port 309 has the configuration as shown in FIG. 5. When the multiplexing access service of the trunk line 504 is not available, it is not necessary to connect the line port 309 to the TDM bus slot 310 as shown in FIG. 11, etc.

Described below is the third example of the operations according to the present invention having the above described configuration.

In the third example of the operations, as shown in FIG. 12, the original voice data terminated by the terminal port 305 is input to one CODEC 1102 in the voice CODEC and CLAD package device 1101 from the TDM-SW 301 through the TDM bus 302 and the TDM bus slot 310, not shown in FIG. 12.

The CODEC 1102 compresses and encodes the original voice data input from the TDM bus 302 through the TDM bus slot 310, and output the data to the SAR layer terminating circuit 1103.

The SAR layer terminating circuit 1103 sequentially generates the SAR-PDU from the compressed and encoded voice data input from the CODEC 1102, sequentially converts the data into an ATM cell, and outputs the result to the ATM bus 304 through the ATM bus slot 311.

The ATM cell is switched by the ATM-SW 303, and is then input from the ATM bus 304 to the TC layer terminating circuit 502 in the line port 309 through the ATM bus slot 311.

The TC layer terminating circuit 502 maps the above described ATM cell to one or more predetermined time slots in the trunk line 504, and outputs the result to the multiplexing/demultiplexing circuit 503. The multiplexing/demultiplexing circuit 503 outputs the above described time slot to the trunk line 504 through the physical layer terminating circuit 501 at a timing corresponding to one or more predetermined time slots in the trunk line 504.

On the other hand, one or more predetermined time slots, to which an ATM cell input from the trunk line 504 through the physical layer terminating circuit 501 is mapped, are first retrieved by the multiplexing/demultiplexing circuit 503, and are then output to the TC layer terminating circuit 502.

The TC layer terminating circuit 502 retrieves an ATM cell from the above described time slot, and outputs it to the ATM-SW 303 through the ATM bus slot 311 and the ATM bus 304.

The ATM-SW 303 transfers the above described ATM cell to the voice CODEC and CLAD package device 1101.

After sequentially retrieving the SR-PDU from the ATM cell input from the ATM bus 304 through the ATM bus slot 311, the SAR layer terminating circuit 1103 in the voice CODEC and CLAD package device 1101 sequentially converts the retrieved SAR-PDU into compressed and encoded voice data, and outputs the result to the CODEC 1102.

The CODEC 1102 decodes the original voice data from the compressed and encoded voice data input from the SAR layer terminating circuit 1103, and outputs the decoded data from the TDM bus slot 310 to the TDM-SW 301 through the TDM bus 302.

The TDM-SW 301 transfers the original voice data to the terminal port 305.

The terminal port 305 transfers the original voice data input from the TDM bus 302 through the TDM bus slot 310 to the PBX 1105 contained in each of the terminal ports 305.

Thus, in the third example of the operations according to the preferred embodiment of the present invention, the voice data can be compressed and encoded, and then mapped to an ATM cell only by connecting the voice CODEC and CLAD package device 1101 of a suitable scale to the ATM bus slot 311 and A the TDM bus slot 310.

In this case, the settings of the control information for mapping the time-division voice data to an ATM cell can be collectively controlled by the control unit 401 shown in FIG. 4 through the control bus 402 and the control bus slot 403. Therefore, the control process can be prevented from becoming complicated.

Since the no-voice detection information for stopping data from being put in a cell in the no-voice period detected by the CODEC 1102 can be easily transmitted to the SAR layer terminating circuit 1103 in the same package device, the control process can be prevented from becoming too complicated.

In the third example of the operations according to the above described preferred embodiment of the present invention, the line port 309 does not necessarily have to terminate an STM exclusive line, but may terminate an ATM exclusive line.

Figure 13:
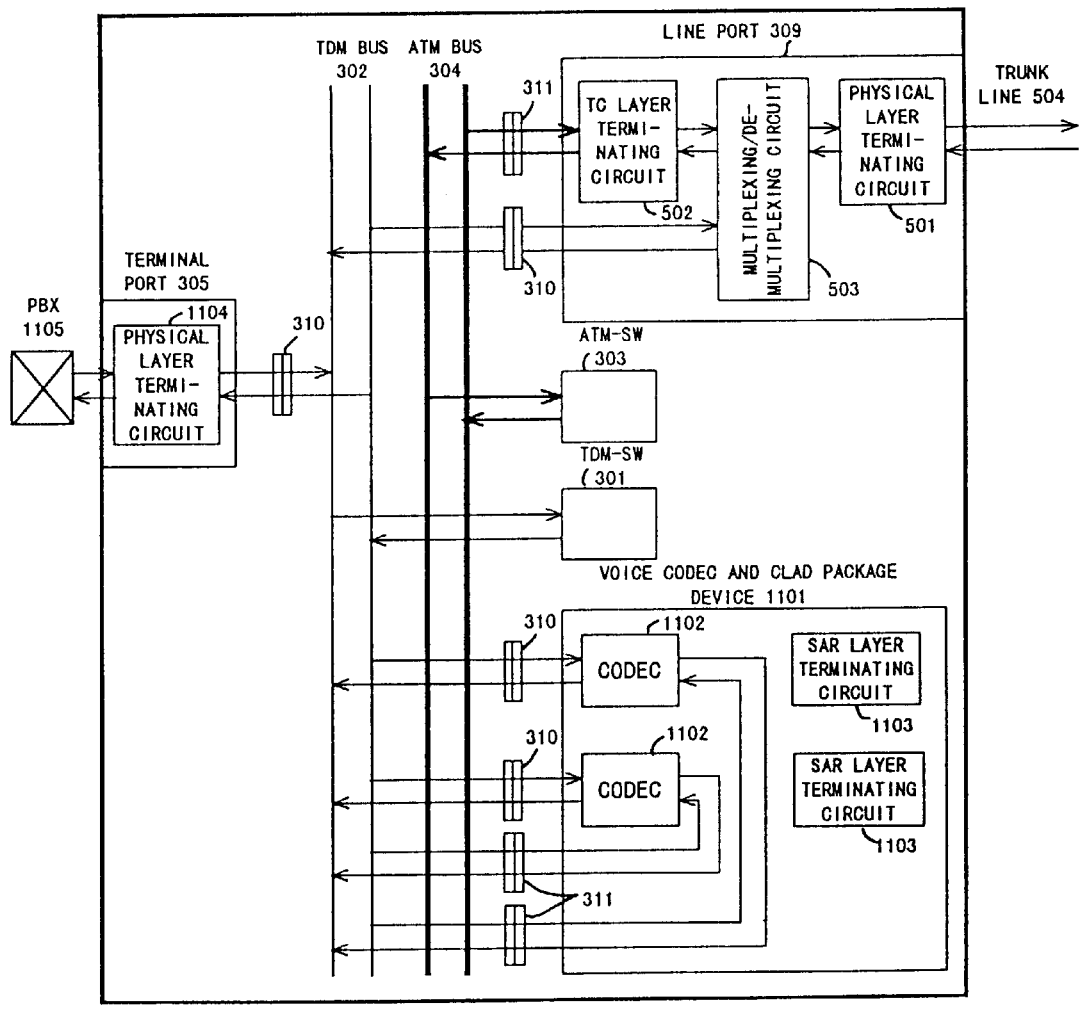
FIG. 13 shows the configuration according to the fourth operation example according to a preferred embodiment of the present invention.

Fourth Example of the Operations According to the Preferred Embodiment of the Present Invention Next, FIG. 13 shows the configuration of the fourth example of the operations according to the preferred embodiment of the present invention. FIG. 14 is an explanatory view of the configuration. The basic configuration shown in FIG. 13 is the same as that shown in FIG. 11.

With the configuration shown in FIG. 13, the voice data, for which it is requested to reduce the deterioration in communications quality due to delay in putting data in a cell, discarding cells, etc. as shown in FIG. 14, is communicated as time-division data without being put in a cell. The time-division data is communicated in a predetermined time slot along the path of: PBX 1105←→terminal port 305←→TDM bus slot 310←→TDM bus 302←→TDM-SW 301←→TDM bus 302←→TDM bus slot 310←→CODEC 1102 in the voice CODEC and CLAD package device 1101 TDM bus slot 310←→TDM bus 302←→TDM-SW 301←→TDM bus 302←→TDM bus slot 310←→multiplexing/demultiplexing circuit 503 in the line port 309←→physical layer terminating circuit 501 in the line port 309←→trunk line 504. This is different from the configuration shown in FIG. 11.

On the other hand, high-burst LAN data, etc. is ATM-multiplexed through the terminal port 306 or 307 (refer to FIG. 3), etc. connected to the ATM bus slot 311, and is communicated in a predetermined time slot as shown in FIG. 14 in the path of: ATM bus slot 311←→ATM-SW 303←→ATM bus 304 ATM bus slot 311←→TC layer terminating circuit 502←→multiplexing-demultiplexing circuit 503←→physical layer terminating circuit 501←→trunk line 504.

Thus, in the fourth example of the operations according to the preferred embodiment of the present invention, as in the case of the first example of the operations according to the preferred embodiment of the present invention, the time slot for transmitting an ATM cell and the time slot for transmitting time-division data can co-exist in the trunk line 504 only by connecting the package device of the line port 309 having the configuration shown in FIG. 11 to the ATM bus slot 311 and the TDM bus slot 310.

In this case, when the voice data should be compressed and encoded as time-division data, the package device 1101 having at least the function of the CODEC 1102 shown in FIG. 11 is to be connected to the TDM bus slot 310. To easily extend the time slot for transmitting an ATM cell, the plural port TC layer process package device 505 shown in FIG. 5 is connected to the ATM bus slot 311 and the TDM bus slot 310.

In the fourth example of the operations according to the preferred embodiment of the present invention, the settings for the communications in the line port 309 and the voice CODEC and CLAD package device 1101 can be collectively controlled by the control unit 401 shown in FIG. 4 through the control bus 402 and the control bus slot 403. Therefore, the control process can be prevented from becoming complicated.

Extended Configuration of the Preferred Embodiment of the Present Invention

Figure 15:
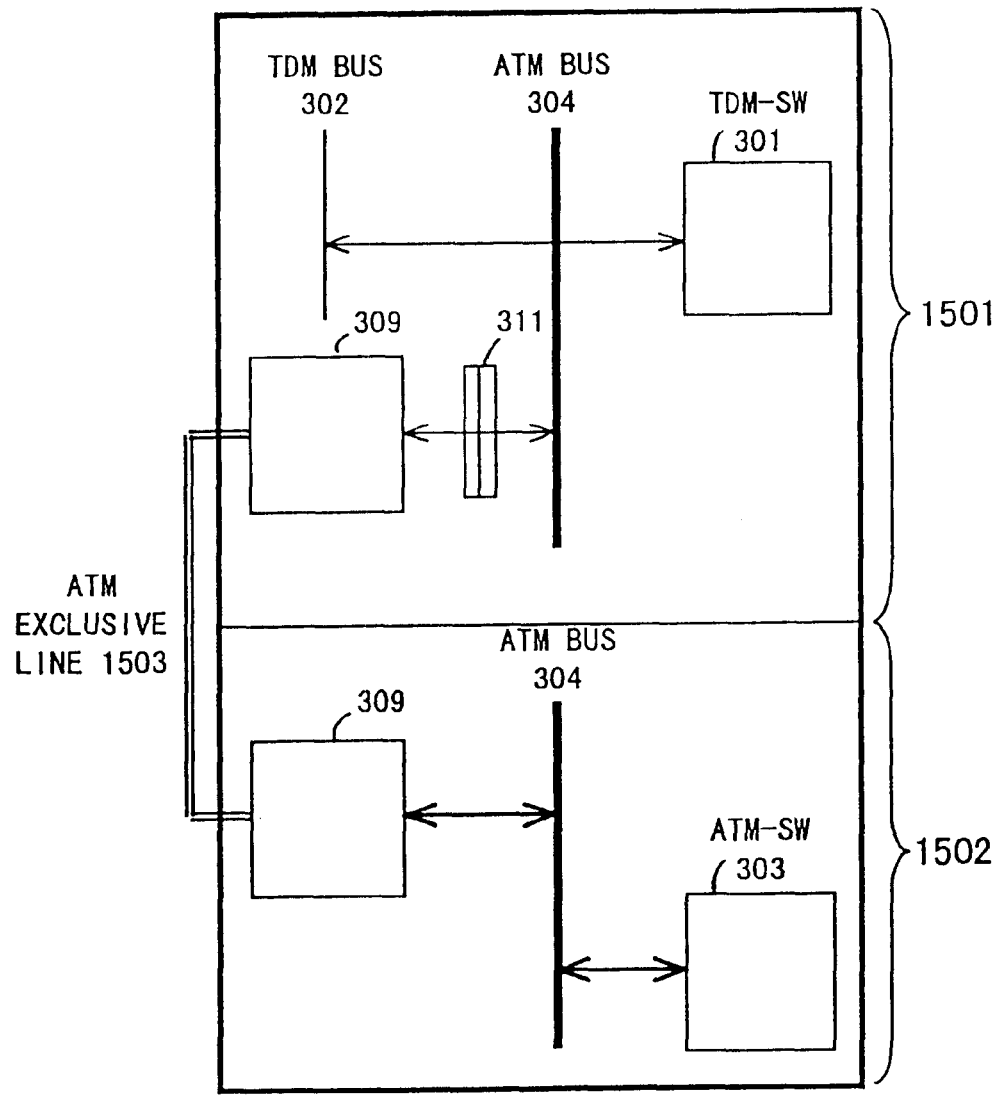
FIG. 15 shows an extended configuration according to a preferred embodiment of the present invention.

Finally, FIG. 15 shows the extended configuration according to the preferred embodiment of the present invention.

In FIG. 15, the extended unit 1501 has the configuration according to the preferred embodiment of the present invention shown in FIG. 3 excluding the ATM-SW 303. Such an extended unit 1501 can be implemented when, for example, it is requested that the TDM communications system using an existing STM exclusive line can be used continuously for the time being. In this case, the extended unit 1501 can be obtained at a low price because it is not provided with the ATM-SW 303 (FIG. 3).

Then, when the ATM communications are introduced, the line port 309 (FIG. 3) for terminating the ATM exclusive line is connected to the ATM bus slot 311 in the extended unit 1501 as shown in FIG. 15. The ATM-SW 303, the ATM bus 304, and the ATM basic unit 1502 provided with the line port 309, etc. are connected to the line port 309.

Thus, according to the extended configuration according to the preferred embodiment of the present invention, a stepwise improvement can be easily realized in function.

In this case, the ATM bus 304 in the extended unit 1501 is connected to the ATM bus 304 in the ATM basic unit 1502 through an ATM interface. Using these buses, the control information is easily transmitted through a standardized ATM interface, thereby preventing the control process from becoming complicated.

Figure 16:
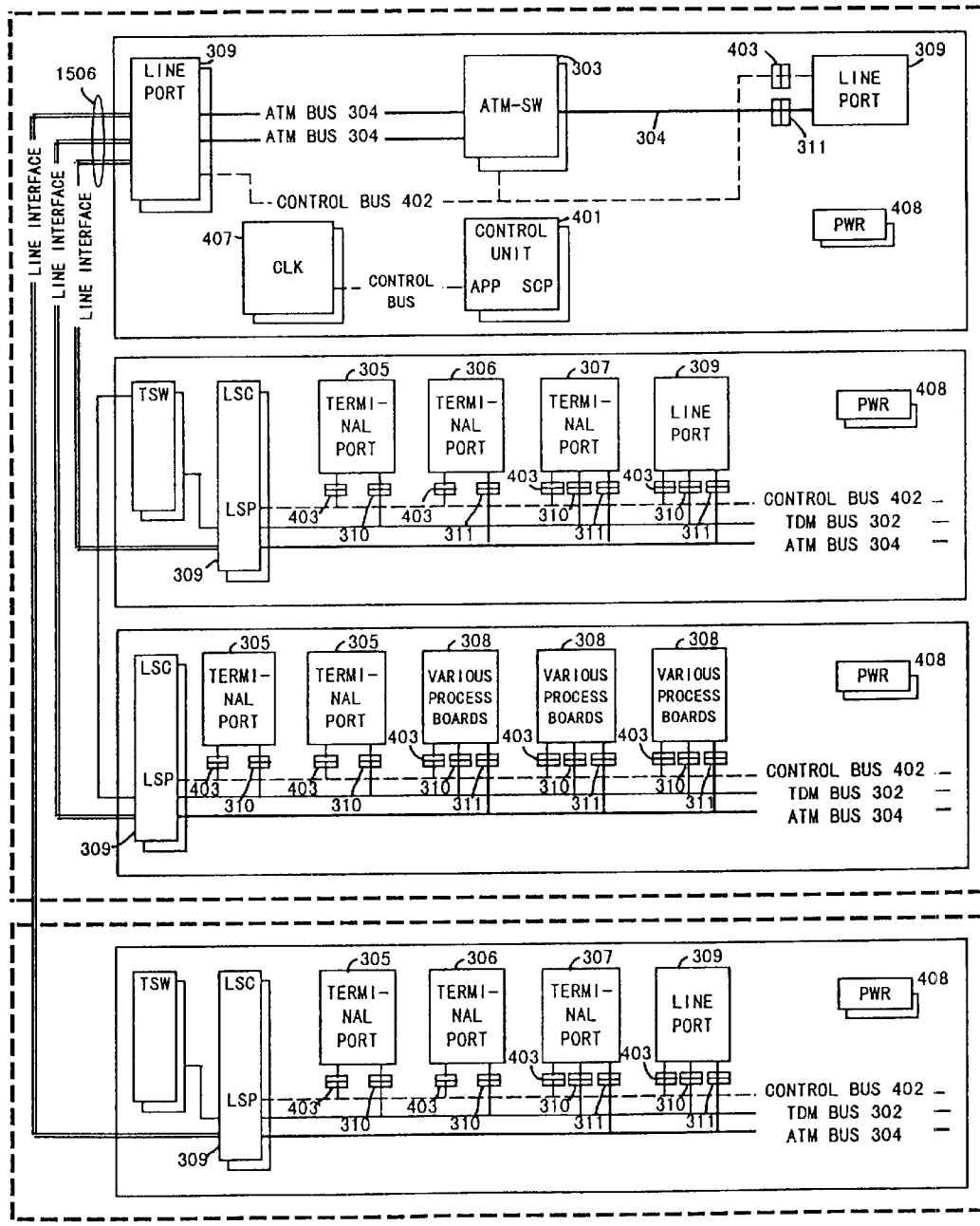
FIG. 16 shows an example of the configuration of the units in the extended configuration according to a preferred embodiment of the present invention.

FIG. 16 shows an example of the configuration of the unit as an extended configuration according to the preferred embodiment of the present invention. In FIG. 16, a unit assigned the same number as a unit shown in FIG. 4 has the same function as that shown in FIG. 4.

As described above, the feature of the extended configuration is that units are connected through the interface of the ATM exclusive line 1503.

With the extended configuration, the units can be quickly connected, the number of the connection signals can be reduced, each unit can be mounted at a remote site, etc.

What is claimed is:

1. A fixed-length cell data and time-division data hybrid multiplexing apparatus capable of processing fixed-length cell data and time-division data in a mixed manner, comprising:

an asynchronous transfer mode bus for transferring the fixed-length cell data in an asynchronous mode;

a time-division multiplexing bus for transferring multiplexed time-division data, a time-division multiplexing switch, connected to said time-division multiplexing bus, for switching time-division data multiplexed in said time-division multiplexing bus;

one or more time-division multiplexing bus slots, connected to said tie-division multiplexing bus, capable of implementing one of various process package devices for processing the time-division data or the fixed-length cell data; and one or more asynchronous transfer mode bus slots, connected to said asynchronous transfer mode bus, capable of implementing one of said various process package devices;

wherein said time-division multiplexing bus slot can be provided with any of a hybrid line port package device including functions of terminating a time-division multiplexing line for transmitting a multiplexed time slot, and mapping fixed-length cell data to said time slot; a hybrid process package device, simultaneously connected to said asynchronous transfer mode bus slot, for mapping a time slot in said time-division multiplexing bus to fixed-length cell data in said asynchronous transfer mode bus; a first terminal port package device for accommodating various terminals; a time-division multiplexing line port package device for terminating a tune-division multiplexing line for transmitting the multiplexed time-division data; and a time-division data process package device for processing time-division data input from the time-division multiplexing bus and outputting the processed data to the time-division multiplexing bus; and said asynchronous transfer mode bus slot can be provided with any of said hybrid line port package device; said hybrid process package device, simultaneously connected to said time-division multiplexing bus slot; a second terminal port package device accommodating various terminals; an asynchronous transfer mode line port package device for terminating an asynchronous transfer mode line for transmitting said fixed-length cell data; and a fixed-length cell process package device for processing fixed-length cell data input from said asynchronous transfer mode bus and outputting the processed data to said asynchronous transfer mode bus;

wherein said hybrid process package device, comprises:

a multiplexing/demultiplexing circuit, connected to said time-division multiplexing bus slot, for multiplexing and outputting, as one or more time-division data plural pieces of low-rate media data input from said time-division multiplexing bus, and conversely demultiplexing the plural pieces of low rate media data from one or more input time-division data and outputting the demultiplexed data to said time-division multiplexing bus; and a cell assembly/disassembly layer terminating circuit, connected to said asynchronous transfer mode bus slot, for sequentially converting one or more pieces of time-division data input from said multiplexing/demultiplexing circuit into a fixed-length call, outputting the cell to said asynchronous transfer mode bus, and conversely converting the fixed-length cell input from said asynchronous transfer mode bus into the one or more pieces of time-division data and outputting the data to said multiplexing/demultiplexing circuit, wherein in the time-division multiplexing line, a time slot for transmitting a fixed-length cell and a time slot for transmitting time-division data is kept in a mixed manner.

2. The apparatus according to claim 1, further comprising:

a control bus for transferring control data; and one or more control bus slots, connected to said control bus, capable of implementing any of said various process package devices.

3. The hybrid line port package device according to claim 1, comprising:

a physical layer terminating circuit for terminating a physical layer of said time division multiplexing line;

a transmission convergence layer terminating circuit, connected to said asynchronous transfer mode bus slot, for mapping fixed-length cell data input from said asynchronous transfer mode bus to one or more predetermined time slots in said time-division multiplexing line, and conversely retrieving the fixed-length cell data from said time slot, and outputting the data to said asynchronous transfer mode bus; and a multiplexing/demultiplexing circuit, connected to said transmission convergence layer terminating circuit, and simultaneously connected to said time-division multiplexing bus slot, for multiplexing time-division data input from said transmission convergence layer terminating circuit and time-division data input from said time-division multiplexing bus, outputting the multiplexed data to said time-division multiplexing line through said physical layer terminating circuit, and conversely demultiplexing a time slot output to said time-division multiplexing bus from a time slot in which said fixed-length cell output from a multiplexed time slot input from said time-division multiplexing line through said physical layer terminating circuit to said transmission convergence layer terminating circuit is mapped.

4. The hybrid process package device according to claim 1, comprising;

one or more transmission convergence layer terminating circuits, connected to said asynchronous transfer mode bus slot, for mapping fixed-length cell data input from said asynchronous transfer mode bus to one or more predetermined time slots in said time-division multiplexing line, and conversely retrieving the fixed-length cell data from said time slot, and outputting the data to said asynchronous transfer mode bus; and a multiplexing/demultiplexing circuit, connected to each of said transmission convergence layer terminating circuits, and simultaneously connected to said time-division multiplexing bus slot, for multiplexing each time slot input from each of said transmission convergence layer terminating circuits outputting the multiplexed data to said time-division multiplexing bias, and conversely demultiplexing each time slot output to each of said transmission conversion layer terminating circuits from a multiplexed time slot input from said time-division multiplexing bus.

5. The hybrid process package device according to claim 1, comprising one or more pairs of:

a voice compressing coder-decoder circuit, connected to said time-division multiplexing bus slot, for compressing, encoding, and outputting voice data input from said time-division multiplexing bus, and conversely decoding compressed, encoded, and input voice data, and outputting the data to said time-division multiplexing bus; and a cell assembly/disassembly layer terminating circuit connected to said asynchronous transfer mode bus slot, for sequentially converting compressed and encoded voice data input from said voice compressing coder-decoder circuit into a fixed-length cell, outputting the cell to said asynchronous transfer mode bus, and conversely converting a fixed-length cell input from said asynchronous transfer mode bus sequentially into the compressed and encoded voice data, and outputting the data to said voice compressing coder-decoder.

6. The time-division data process package device according to claim 1, comprising one or more voice compressing coder-decoder circuits, connected to said time-division multiplexing bus slot for compressing and encoding voice data input from said time-division multiplexing bus, outputting the data to said time-division multiplexing bus, and conversely decoding compressed and encoded voice data input from said time-division multiplexing bus, and outputting the data to said time-division multiplexing bus.

7. A fixed-length cell data and time-division data hybrid multiplexing system having as a component the fixed-length cell data and time-division data hybrid multiplexing apparatus according to claim 1, having a configuration in which one fixed-length cell data and time-division data hybrid multiplexing device or a fixed-length cell data processing device for processing the fixed-length cell data, and another one or more fixed-length cell data and time-division data hybrid multiplexing devices are interconnected to each other by an asynchronous transfer mode line for transmitting the fixed-length cell data through an asynchronous transfer mode line port package device connected to an asynchronous transfer mode bus slot in each of the fixed-length cell data and time-division data hybrid multiplexing devices.

8. A fixed-length cell data and time-division data hybrid multiplexing apparatus capable of processing fixed-length cell data and time-division data in a mixed manner, comprising;
  an asynchronous transfer mode bus for transferring the fixed-length cell data in an asynchronous mode;
  a time-division multiplexing bus for transferring multiplexed time-division data;
  a time-division multiplexing switch, connected to said time-division multiplexing bus, for switching time-division data multiplexed in said time-division multiplexing bus;
  an asynchronous transfer mode switch, connected to said asynchronous transfer mode bus, for switching fixed-length cell data in said asynchronous transfer mode bus;
  one or more time-division multiplexing bus slots, connected to said time-division multiplexing bus, capable of implementing one of various process package devices for processing the time-division data or the fixed-length cell data; and
  one or more asynchronous transfer mode bus slots, connected to said asynchronous transfer mode bus, capable of implementing one of said various process package devices,
  wherein said time division multiplexing bus slot can be provided with any of a hybrid line port package device including functions of terminating a time-division multiplexing line for transmitting a multiplexed time slot, and mapping fixed-length cell data to said time slot; a hybrid process package device simultaneously connected to said asynchronous transfer mode bus slot, for mapping a time slot in said time-division multiplexing bus to fixed-length cell data in said asynchronous transfer mode bus; a first terminal part package device for accommodating various terminals; a time-division multiplexing line port package device for terminating a time-division multiplexing line for transmitting the multiplexed time-division data; and a time-division data process package device for processing time-division data input from the time-division multiplexing bus and outputting the processed data to the time-division multiplexing bus; and
  said asynchronous transfer mode bus slot can be provided with any of said hybrid line port package device said hybrid process package device, simultaneously connected to said time-division multiplexing bus slot; a second terminal port package device accommodating various terminals; an asynchronous transfer mode line port package device for terminating an asynchronous transfer mode line for transmitting said fixed-length cell data; and a fixed-length cell process package device for processing fixed-length cell data input from said asynchronous transfer mode bus and outputting the processed data to said asynchronous transfer mode bus, said hybrid process package device comprising:
  a multiplexing/demultiplexing circuit, connected to said time-division, multiplexing bus slot, for multiplexing and outputting as one or more time-division data, plural pieces of low-rate media data input from said time-division multiplexing bus, and conversely demultiplexing the plural pieces of low rate media data from one or more input time-division data and outputting the demultiplexed data to said time-division multiplexing bus; and
  a cell assembly/disassembly layer terminating circuit, connected to said asynchronous transfer mode bus slot, for sequentially converting one or more pieces of time-division data input from said multiplexing/demultiplexing circuit into a fixed-length cell, outputting the cell to said asynchronous transfer mode bus, and conversely converting the fixed-length cell input from said asynchronous transfer mode bus into the one or more pieces of time-division data and outputting the data to said multiplexing/demultiplexing circuit, wherein in the time-division multiplexing line, a time slot for transmitting a fixed-length cell and a time slot for transmitting time-division data is kept in a mixed manner.

9. The apparatus according to claim 8, further comprising:
a control bus for transferring control data; and
one or more control bus slots, connected to said control bus, capable of implementing any of said various process package devices.

10. The hybrid line point package device according to claim 8, comprising:
  a physical layer terminating circuit for terminating a physical layer of said time-division multiplexing line;
  a transmission convergence layer terminating circuit, connected to said asynchronous transfer mode bus slot, for mapping fixed-length cell data input from said asynchronous transfer mode bus to one or more predetermined time slots in said time division multiplexing line, and conversely retrieving the fixed-length cell data from said time slot, and outputting the data to said asynchronous transfer mode bus; and
  a multiplexing/demultiplexing circuit, connected to said transmission convergence layer terminating circuit, and simultaneously connected to said time-division multiplexing bus slot, for multiplexing time-division data input from said transmission convergence layer terminating circuit and time-division data input from said time-division multiplexing bus, outputting the multiplexed data to said time-division multiplexing line through said physical layer terminating circuit, and conversely demultiplexing a time slot output to said time-division multiplexing bus from a time slot in which said fixed-length cell output from a multiplexed time slot input from said time-division multiplexing line through said physical layer terminating circuit to said transmission convergence layer terminating circuit is mapped.

11. The hybrid process package device according to claim 8, comprising:
- one or more transmission convergence layer terminating circuits, connected to said asynchronous transfer mode bus slot, for mapping fixed-length cell data input from said asynchronous transfer mode bus to one or more predetermined time slots in said time-division multiplex line, and conversely retrieving the fixed-length cell data from said time slot, and outputting the data to said asynchronous transfer mode bus; and
- a multiplexing/demultiplexing circuit, connected to each of said transmission convergence layer terminating circuit and simultaneously connected to said time-division multiplexing bus slot, for multiplexing each time slot input from each of said transmission convergence layer terminating circuits, outputting the multiplexed data to said time-division multiplexing bus, and conversely demultiplexing each time slot output to each of said transmission conversion layer terminating circuits from a multiplexed time slot input from said time-division multiplexing bus.

12. The hybrid process package device according to claim 8, comprising one or more pairs of:
- a voice compressing coder-decoder circuit, connected to said time-division multiplexing bus slot, for compressing, encoding, and outputting voice data input from said time-division multiplexing bus, and conversely decoding compressed, encoded, and input voice data outputting the data to said time-division multiplexing bus; and
- a cell assembly/disassembly layer terminating circuit, connected to said asynchronous transfer mode bus slot, for sequentially converting compressed and encoded voice data input from said voice compressing coder-decoder circuit into a fixed-length cell, outputting the cell to said asynchronous transfer mode bus, and conversely converting a fixed-length cell input from said asynchronous transfer mode bus sequentially into the compressed and encoded voice data, the outputting the data to said voice compressing coder-decoder.

13. The time-division data process package device according to claim 8, comprising one or more voice compressing coder-decoder circuits, connected to said time-division multiplexing bus slot, for compressing and encoding voice data input from said time-division multiplexing bus, outputting the data to said time-division multiplexing bus, and conversely decoding compressed and encoded voice data input from said time-division multiplexing bus, and outputting the data to said time-division multiplexing bus.

14. The fixed-length cell data and time-division date hybrid multiplexing apparatus according to claim 8, containing a configuration in which one fixed-length cell data and time-division data hybrid multiplexing device or a fixed-length cell data processing device for processing the fixed-length cell data, and another one or more fixed-length cell data and time-division data hybrid multiplexing devices are interconnected to each other by an asynchronous transfer mode line for transmitting the fixed-length cell data through an asynchronous transfer mode line port package device connected to an asynchronous transfer mode bus slot in each of the fixed-length cell data and time-division data hybrid multiplexing devices.

* * * * *